United States Patent
Panandiker et al.

(10) Patent No.: US 9,574,161 B2
(45) Date of Patent: Feb. 21, 2017

(54) FABRIC CARE COMPOSITIONS COMPRISING POLYURETHANE, POLYUREA AND/OR POLYURETHANEUREA POLYMERS

(71) Applicant: The Procter & Gamble Company, Cincinnati, OH (US)

(72) Inventors: Rajan Keshav Panandiker, West Chester, OH (US); Bernard William Kluesener, Harrison, OH (US); Julie Ann Menkhaus, Cleves, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 161 days.

(21) Appl. No.: 14/698,879

(22) Filed: Apr. 29, 2015

(65) Prior Publication Data

US 2015/0307816 A1 Oct. 29, 2015

Related U.S. Application Data

(60) Provisional application No. 61/985,637, filed on Apr. 29, 2014.

(51) Int. Cl.

| | | |
|---|---|---|
| C08G 77/26 | (2006.01) | |
| A61K 8/898 | (2006.01) | |
| C11D 1/82 | (2006.01) | |
| C11D 3/32 | (2006.01) | |
| C11D 9/36 | (2006.01) | |
| C11D 3/37 | (2006.01) | |
| C08G 77/388 | (2006.01) | |
| C11D 11/00 | (2006.01) | |
| D06M 15/643 | (2006.01) | |

(52) U.S. Cl.
CPC ........... *C11D 3/3742* (2013.01); *C08G 77/388* (2013.01); *C11D 11/0017* (2013.01); *D06M 15/6436* (2013.01)

(58) Field of Classification Search
CPC ........... C08G 77/26; A61K 8/898; C11D 1/82; C11D 3/001; C11D 3/162; C11D 3/32;C11D 3/323; C11D 3/373; C11D 3/3742; C11D 9/225; C11D 9/36; C11D 11/0017
See application file for complete search history.

(56) References Cited

U.S. PATENT DOCUMENTS

| | | | |
|---|---|---|---|
| 5,290,615 A * | 3/1994 | Tushaus | C08G 18/61 427/387 |
| 7,560,166 B2 * | 7/2009 | Moore | C08G 77/458 428/447 |
| 8,138,222 B2 | 3/2012 | Valenti et al. | |
| 8,785,587 B2 * | 7/2014 | Wagner | A61K 8/898 424/70.122 |
| 2002/0103094 A1 | 8/2002 | Masschelein et al. | |
| 2003/0176613 A1 | 9/2003 | Hohberg et al. | |
| 2010/0047589 A1 * | 2/2010 | Ochs | B32B 17/10018 428/429 |

FOREIGN PATENT DOCUMENTS

| | | |
|---|---|---|
| WO | WO 00/27958 A1 | 5/2000 |
| WO | WO 01/05874 A1 | 1/2001 |
| WO | WO 2009/069077 A2 | 6/2009 |
| WO | WO 2010/120863 A1 | 10/2010 |
| WO | WO 2011/011799 A2 | 1/2011 |

OTHER PUBLICATIONS

International Search Report; International Application No. PCT/US2015/028108; date of mailing Aug. 26, 2015; 14 pages.

Needleman, S. B., et al., A General Method Applicable to the Search for Similarities in the Amino Acid Sequence of Two Proteins, J. Mol. Biol., 1970, pp. 443-453, vol. 48.

\* cited by examiner

*Primary Examiner* — Charles Boyer
(74) *Attorney, Agent, or Firm* — James F. McBride; Steven W. Miller

(57) ABSTRACT

The present disclosure relates to compositions and systems comprising fit retention polymers and methods of making and using the same. Methods of using such compositions including contacting a fabric with the fabric care composition are also disclosed.

23 Claims, No Drawings

FABRIC CARE COMPOSITIONS COMPRISING POLYURETHANE, POLYUREA AND/OR POLYURETHANEUREA POLYMERS

FIELD OF THE INVENTION

The present disclosure relates to compositions and systems comprising fit retention polymers and methods of making and using the same.

BACKGROUND OF THE INVENTION

When fabrics such as garments are worn, such fabric may lose their shape due to stresses and strains on the garment fibers that occur, for example, due to everyday movements by the wearer. As a result, the "fit" of the garment is lost and the garment's appearance as well as comfort is lost. In order to alleviate this problem, fibers such a spandex (elastane) are incorporated into certain garments and/or garment weaves may be altered. Unfortunately, such solutions typically increase the cost of a garment and must be done at a textile mill when the fabric that is used in such garment is made. Thus, if such a solution is not implemented from the start, such "fit" issue cannot addressed subsequently.

So, what is needed is a solution to the "fit" problem that can implemented at any time during a fabric's life. Applicants provide such a solution herein.

SUMMARY OF THE INVENTION

The present disclosure relates to compositions and systems comprising fit retention polymers and methods of making and using the same. Methods of using such compositions including contacting a fabric with the fabric care composition are also disclosed.

DETAILED DESCRIPTION OF THE INVENTION

As used herein, the articles "a" and "an" when used in a claim, are understood to mean one or more of what is claimed or described.

As used herein, the term "comprising" means various components conjointly employed in the preparation of the compositions of the present disclosure. Accordingly, the terms "consisting essentially of" and "consisting of" are embodied in the term "comprising."

As used herein, "fabric care compositions" include compositions for handwash, machine wash, additive compositions, compositions suitable for use in the soaking and/or pretreatment of stained fabrics, rinse-added compositions, sprays and ironing aids. The fabric care compositions may take the form of, for example, liquid and granule laundry detergents, fabric conditioners, other wash, rinse, dryer-added products such as sheet, and sprays, encapsulated and/or unitized dose compositions, ironing aids, fabric sprays for use on dry fabrics, or as compositions that comprise two or more separate phases that are dispensed together. Fabric care compositions in the liquid form are generally in an aqueous carrier, and generally have a viscosity from about 1 to about 2000 centipoise (1-2000 mPa*s), or from about 200 to about 800 centipoises (200-800 mPa*s). Viscosity can be determined by conventional methods readily known in the art. The term also encompasses low-water or concentrated formulations such as those containing less than about 50% or less than about 30% or less than about 20% water or other carrier.

As used herein, the term "substituted" means the replacement of —H with a chemically acceptable moiety, for example a hydroxyl, an amine, an aromatic, an alkoxy, a carboxylate, a phosphate, or a sulphate.

As used herein, the terms "include," "includes," and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Form of Composition.

The composition can be any liquid form, for example a liquid or gel form, or any combination thereof. The composition may be in any unit dose form, for example a pouch. However, it is extremely highly preferred for the composition to be in gel form.

The composition can be a fully finished laundry detergent composition, fabric treatment composition and/or fabric enhancer. In one aspect, the composition is not just a component of a laundry detergent composition that can be incorporated into a laundry detergent composition, it is a fully finished laundry detergent composition. In one aspect, it is within the scope of the present invention for an additional rinse additive composition (e.g. fabric conditioner or enhancer), or a main wash additive composition (e.g. bleach additive) to also be used in combination with the liquid laundry detergent composition during the method of the present invention. In one aspect, no bleach additive composition is used in combination with the laundry detergent composition during the method of the present invention.

In one aspect, a fabric care composition comprising
a) from about 0.01% to about 30%, preferably from about 0.01% to about 20%, more preferably from about 0.1% to about 10%, most preferably from about 0.5% to about 5%, based on total fabric care composition weight, of an organosiloxane polymer comprising having Formula I, Formula II or Formula III below:

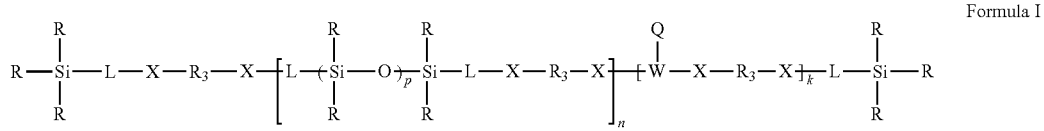

Formula I

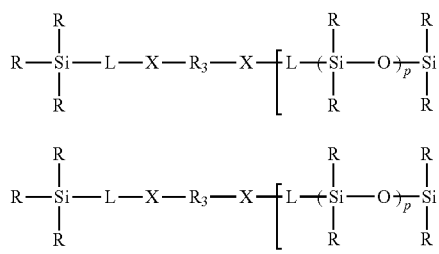
Formula II

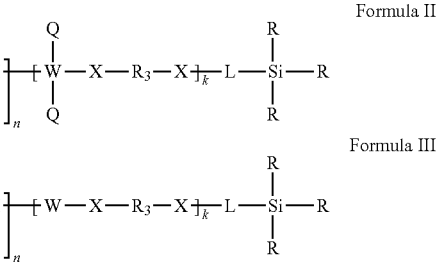
Formula III said Formula I comprising a total of from 1 to about 200 Qs and said Formula II comprising from 2 to about 200 Qs, each Q for Formula I and II being independently selected from Formula IV, Formula V and Formula VI below:

Formula IV
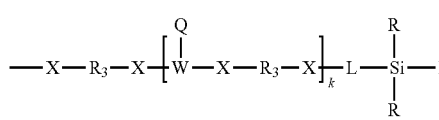

Formula V
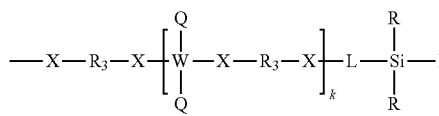

Formula VI
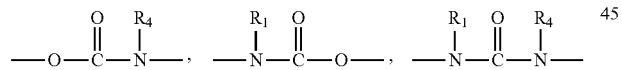

wherein for each Formula I through VI;
(i) each X is independently selected from the group consisting of

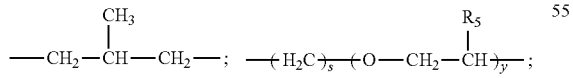

and combinations thereof;
(ii) each L is a linking bivalent alkylene radical, preferably each L is independently selected from the group consisting of —CH$_2$—CH(CH$_3$)—CH$_2$—; —(H$_2$C)$_s$—(O—CH$_2$—CH(R$_5$))$_y$—;

—(CH$_2$)$_s$—; most preferably L is —(CH$_2$)$_s$—;
(iii) at least one, preferably at least two, more preferably at least three R moieties are —OR$_2$, and all other R moieties are independently selected from the group consisting of H, C$_1$-C$_{20}$ alkyl radical, C$_1$-C$_{20}$ substituted alkyl radical, C$_6$-C$_{20}$ aryl radical, C$_6$-C$_{20}$ substituted aryl radical, C$_7$-C$_{20}$ alkylaryl radical and combinations thereof, in one aspect 1 to 6, preferably 2 to 6, more preferably 2 to 4 R moieties are —OR$_2$ and said R moieties are covalently bound to a terminal Si;
(iv) each R$_1$ is independently selected from the group consisting of, H, a C$_1$-C$_{20}$ alkyl radical, a C$_6$-C$_{10}$ aryl radical, a C$_1$-C$_4$ substituted alkyl radical, and a C$_6$-C$_{10}$ cycloalkyl radical; preferably, each R$_1$ is independently selected from the group consisting of H and a C$_1$-C$_4$ alkyl radical; more preferably, each R$_1$ is H;
(v) each R$_2$ is independently selected from the group consisting of H, a C$_1$-C$_4$ alkyl radical, —C(O)R$_6$ wherein each R$_6$ is independently selected from the group consisting of C$_1$-C$_{20}$ alkyl radical, C$_1$-C$_{20}$ substituted alkyl radical, C$_6$-C$_{20}$ aryl radical, C$_6$-C$_{20}$ substituted aryl radical, and C$_7$-C$_{20}$ alkylaryl radical;
(vi) each R$_3$ is independently selected from the group consisting of an aromatic radical comprising from 6 to 30 carbon atoms, preferably from 6 to 20 carbon atoms, more preferably from 6 to 14 carbon atoms, an aliphatic radical comprising from 2 to 30 carbon atoms, preferably from 2 to 20 carbon atoms from more preferably 2 to 14 carbon atoms and a cycloaliphatic radical comprising from 6 to 30 carbon atoms, preferably from 6 to 20 carbon atoms, more preferably from 6 to 14 carbon atoms; and
(vii) each R$_4$ is independently selected from the group consisting of H, a C$_1$-C$_{20}$ alkyl radical, a C$_6$-C$_{10}$ aryl radical, a C$_1$-C$_4$ substituted alkyl radical, and a C$_6$-C$_{10}$ cycloalkyl radical; preferably, each R$_4$ is independently selected from the group consisting of H and a C$_1$-C$_4$ alkyl radical; more preferably, each R$_4$ is H;
(viii) each R$_5$ is independently selected from the group consisting of H, a C$_1$-C$_4$ alkyl radical, a C$_1$-C$_4$ substituted alkyl radical, a C$_6$-C$_{10}$ aryl radical, and a C$_6$-C$_{10}$ substituted aryl radical; preferably each R$_5$ is independently selected from the group consisting of H and a C$_1$-C$_2$ alkyl radical;
(ix) each W is independently selected from the group consisting of a C$_1$-C$_{200}$ alkylene radical that optionally comprises at least one hetero atom that interrupts said C$_1$-C$_{200}$ chain, or a substituted C$_1$-C$_{200}$ alkylene radical that optionally comprises at least one hetero atom that interrupts said C$_1$-C$_{200}$ chain and/or optionally at least one hetero atom that interrupts said substituent; preferably, each W is independently selected from the group consisting of a C$_1$-C$_{100}$ alkylene radical that optionally comprises at least one hetero atom that interrupts said C$_1$-C$_{100}$ chain or a substituted C$_1$-C$_{100}$ alkylene radical that optionally comprises at least one hetero atom that interrupts said C$_1$-C$_{100}$ chain, and/or optionally at least one hetero atom that interrupts said substituent; preferably said $C_1$-$C_{100}$ chain is interrupted by at least one hetero atom; more preferably each W is independently selected from a substituted $C_1$-$C_{10}$ alkylene radical that optionally comprises at least one hetero atom that interrupts said $C_1$-$C_{10}$ chain, and/or optionally at least one hetero atom that interrupts said substituent; preferably each W is independently selected from the group consisting of

[chemical structures shown]

(xii) y is an integer of from about 1 to about 50, preferably from about 1 to about 20, more preferably from about 1 to about 10;

(xiii) n is an integer of from about 0 to about 50, preferably from about 1 to about 50, more preferably from about 1 to about 20, most preferably from about 1 to about 10;

(xiv) k is an integer selected from 0 to about 100, preferably from about 1 to about 50, more preferably from about 5 to about 20; and b) optionally, a material having the formula $Si(R_7)_m(OR_8)_j$ wherein the index j is 1 to 4 and the index m=4-j and each $R_7$ is independently selected from the group consisting of $C_1$-$C_{20}$ alkyl radical, $C_1$-$C_{20}$ substituted alkyl radical, $C_6$-$C_{20}$ aryl radical, $C_6$-$C_{20}$ substituted aryl radical, and $C_7$-$C_{20}$ alkylaryl radical, preferably $R_7$ comprises a double bond, and each $R_8$ is independently selected from the group consisting of H, $C_1$-$C_{20}$ alkyl radical, $C_1$-$C_{20}$ substituted alkyl radical, $C_6$-$C_{20}$ aryl radical, $C_6$-$C_{20}$ substituted aryl radical, $C_7$-$C_{20}$ alkylaryl radical, and —C(O)$R_9$, wherein each $R_9$ is independently selected from the group consisting of $C_1$-$C_{20}$ alkyl radical, $C_1$-$C_{20}$ substituted alkyl radical, $C_6$-$C_{20}$ aryl radical, $C_6$-$C_{20}$ substituted aryl radical, and $C_7$-$C_{20}$ alkylaryl radical;

c) optionally a solvent system d) optionally a carrier; and e) optionally, based on total fabric care composition weight, from about 0.1% to about 95%, of a surfactant is disclosed.

In one aspect, a fabric care composition comprising a. from about 0.01% to about 30%, preferably from about 0.01% to about 20%, more preferably from about 0.1% to about 10%, most preferably from about 0.5% to about 5%, based on total fabric care composition weight, of an organosiloxane polymer comprising at least one repeat unit having Formula (I):

$$R-\underset{R}{\overset{R}{Si}}-L-X-R_3-X-\left[L-\left(\underset{R}{\overset{R}{Si}}-O\right)_p\underset{R}{\overset{R}{Si}}-L-X-R_3-X\right]_n[W-X-R_3-X]_k-L-\underset{R}{\overset{R}{Si}}-R \quad \text{Formula I}$$

wherein for

[structure: $\{O-\underset{R_5}{\phantom{-}}\}_y$]

$R_5$ and y are as previously described above (x) p is an integer of from about 2 to about 2000, preferably from about 2 to about 1000, more preferably from about 10 to about 400, most preferably from about 20 to about 200;

(xi) s is an integer of from about 2 to about 83, preferably from about 2 to about 10, more preferably from about 2 to about 4;

wherein (i) each X is independently selected from the group consisting of $$-O-\underset{\underset{R_4}{|}}{\overset{\overset{O}{\|}}{C}}-N-, \quad -N-\underset{\underset{|}{\phantom{|}}}{\overset{\overset{R_1}{|}}{\phantom{X}}}\overset{\overset{O}{\|}}{C}-O-, \quad -N-\underset{\underset{R_4}{|}}{\overset{\overset{R_1}{|}}{\phantom{X}}}\overset{\overset{O}{\|}}{C}-N-$$

and combinations thereof;

(ii) each L is a linking bivalent alkylene radical, or independently selected from the group consisting of

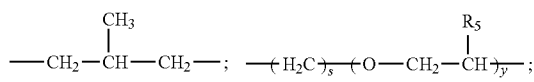

—(CH$_2$)$_s$—; and combinations thereof;

(iii) at least one, preferably at least two, more preferably at least three R moieties of Formula I are —OR$_2$, and all other R moieties are independently selected from the group consisting of H, C$_1$-C$_{20}$ alkyl radical, C$_1$-C$_{20}$ substituted alkyl radical, C$_6$-C$_{20}$ aryl radical, C$_6$-C$_{20}$ substituted aryl radical, C$_7$-C$_{20}$ alkylaryl radical and combinations thereof, in one aspect 1 to 6, preferably 2 to 6, more preferably 2 to 4 R moieties are —OR$_2$ and said R moieties are covalently bound to a terminal Si;

(iv) each R$_1$ is independently selected from the group consisting of, H, a C$_1$-C$_{20}$ alkyl radical, a C$_6$-C$_{10}$ aryl radical, a C$_1$-C$_4$ substituted alkyl radical, and a C$_6$-C$_{10}$ cycloalkyl radical; preferably, each R$_1$ is independently selected from the group consisting of H and a C$_1$-C$_4$ alkyl radical; more preferably, each R$_1$ is H;

(v) each R$_2$ is independently selected from the group consisting of H, a C$_1$-C$_4$ alkyl radical, —C(O)R$_6$ wherein each R$_6$ is independently selected from the group consisting of C$_1$-C$_{20}$ alkyl radical, C$_1$-C$_{20}$ substituted alkyl radical, C$_6$-C$_{20}$ aryl radical, C$_6$-C$_{20}$ substituted aryl radical, and C$_7$-C$_{20}$ alkylaryl radical;

(vi) each R$_3$ is independently selected from the group consisting of an aromatic radical comprising from 6 to 30 carbon atoms, preferably from 6 to 20 carbon atoms, more preferably from 6 to 14 carbon atoms, an aliphatic radical comprising from 2 to 30 carbon atoms, preferably from 2 to 20 carbon atoms from more preferably 2 to 14 carbon atoms and a cycloaliphatic radical comprising from 6 to 30 carbon atoms, preferably from 6 to 20 carbon atoms, more preferably from 6 to 14 carbon atoms; and (vii) each R$_4$ is independently selected from the group consisting of H, a C$_1$-C$_{20}$ alkyl radical, a C$_6$-C$_{10}$ aryl radical, a C$_1$-C$_4$ substituted alkyl radical, and a C$_6$-C$_{10}$ cycloalkyl radical; preferably, each R$_4$ is independently selected from the group consisting of H and a C$_1$-C$_4$ alkyl radical; more preferably, each R$_4$ is H;

(viii) each R$_5$ is independently selected from the group consisting of H, a C$_1$-C$_4$ alkyl radical, a C$_1$-C$_4$ substituted alkyl radical, a C$_6$-C$_{10}$ aryl radical, and a C$_6$-C$_{10}$ substituted aryl radical; preferably each R$_5$ is independently selected from the group consisting of H and a C$_1$-C$_2$ alkyl radical;

(ix) each W is independently selected from the group consisting of a C$_1$-C$_{200}$ alkylene radical that optionally comprises at least one hetero atom that interrupts said C$_1$-C$_{200}$ chain; preferably, each W is independently selected from the group consisting of a C$_1$-C$_{100}$ alkylene radical that optionally comprises at least one hetero atom that interrupts said C$_1$-C$_{100}$ chain, preferably said C$_1$-C$_{100}$ chain is interrupted by at least one hetero atom; more preferably each W is independently selected from a substituted C$_1$-C$_{10}$ alkylene radical that optionally comprises at least one hetero atom that interrupts said C$_1$-C$_{10}$ chain;

(x) p is an integer of from about 2 to about 2000, preferably from about 2 to about 1000, more preferably from about 10 to about 400, most preferably from about 20 to about 200;

(xi) s is an integer of from about 2 to about 83, preferably from about 2 to about 10, more preferably from about 2 to about 4;

(xii) y is an integer of from about 1 to about 50, preferably from about 1 to about 20, more preferably from about 1 to about 10;

(xiii) n is an integer of from about 0 to about 50, preferably from about 1 to about 50, more preferably from about 1 to about 20, most preferably from about 1 to about 10;

(xiv) k is an integer selected from 0 to about 100, preferably from about 1 to about 50, more preferably from about 5 to about 20; and b. optionally, a material having the formula Si(R$_7$)$_m$(OR$_8$)$_j$ wherein the index j is 1 to 4 and the index m=4-j and each R$_7$ is independently selected from the group consisting of C$_1$-C$_{20}$ alkyl radical, C$_1$-C$_{20}$ substituted alkyl radical, C$_6$-C$_{20}$ aryl radical, C$_6$-C$_{20}$ substituted aryl radical, and C$_7$-C$_{20}$ alkylaryl radical, preferably R$_7$ comprises a double bond, and each R$_8$ is independently selected from the group consisting of H, C$_1$-C$_{20}$ alkyl radical, C$_1$-C$_{20}$ substituted alkyl radical, C$_6$-C$_{20}$ aryl radical, C$_6$-C$_{20}$ substituted aryl radical, C$_7$-C$_{20}$ alkylaryl radical, and —C(O)R$_9$, wherein each R$_9$ is independently selected from the group consisting of C$_1$-C$_{20}$ alkyl radical, C$_1$-C$_{20}$ substituted alkyl radical, C$_6$-C$_{20}$ aryl radical, C$_6$-C$_{20}$ substituted aryl radical, and C$_7$-C$_{20}$ alkylaryl radical;

c. optionally a solvent system d. optionally a carrier; and e. optionally, based on total fabric care composition weight, from about 0.1% to about 95%, of a surfactant is disclosed.

In one aspect of said fabric care composition said organosiloxane polymer comprises, based on total organosiloxane polymer weight, from about 5% to about 100%, preferably from about 20% to about 100%, or more preferably from about 50% to about 100% of said repeat units having Formula (I).

In one aspect of said fabric care composition 1 to 20, preferably 1 to 10, more preferably 2 to 6 R moieties of Formula I are —OR$_2$.

In one aspect of said fabric care composition the solvent system is selected from the group consisting of a solvent having a C log P from about −0.180 to about 3.764, preferably said solvent is selected from the group consisting of water, glycerine, polyglycerine, ethylene glycol, diethylene glycol, polyethylene glycol, propylene glycol, dipropylene glycol, polypropylene glycol, butylene glycol, mono, di and triethanolamine, methyldiethanolamine, diethylene glycol monomethyl ether, mono and diacetin, methanol and mixtures thereof.

In one aspect of said fabric care composition said solvent is selected from the group consisting of ethanol, acetic acid, 1-propanol, 1-butanol, 2-propanol, acetonitrile, t-butyl alcohol, dimethylformamide, acetone, 1,2-dichloroethane, methylene chloride, chloroform, ethylacetate, tetrahydrofuran, dioxane, methyl t-butyl ether, diethyl ether, benzene, toluene, butyl cellosolve, butyl carbitol, hexylene glycol, water, glycerine, polyglycerine, ethylene glycol, diethylene glycol, polyethylene glycol, propylene glycol, dipropylene glycol, polypropylene glycol, butylene glycol, mono, di and triethanolamine, methyldiethanolamine, diethylene glycol monomethyl ether, mono and diacetin, methanol and mixtures thereof.

In one aspect of said fabric care composition, said fabric care composition comprises from 1% to 49% by weight of the composition a quaternary ammonium compound suitable for softening fabric, and from 0.1% to 3% perfume.

In one aspect of said fabric care composition, said carrier is selected from the group consisting of polymers, waxes, salts and mixtures thereof, preferably said polymer is selected from a polysaccharide, a polyethylene glycol and mixtures thereof and, said salt is selected from a detergent builder.

In one aspect of said fabric care composition said surfactant is selected from:
  a. an anionic surfactant, preferably said anionic surfactant is selected from the group consisting of alkyl benzene sulfonate, alkyl and alkylaryl sulfate, alkyl and alkylaryl carboxylate, alkyl ethoxy sulfate, alkyl glyceryl sulfonate, ammonium lauryl sulfate, sodium lauryl sulfate, sodium laureth sulfate, linear alkylbenzene sulfonates and mixtures thereof;
  b. a cationic surfactant, preferably said cationic surfactant is selected from the group consisting of alkyltrimethylammonium salts, cetyl trimethylammonium bromide, cetyl trimethylammonium chloride, cetylpyridinium chloride, quaternary ammonium surfactant, ester quaternary ammonium compound and mixtures thereof;
  c. an amphoteric surfactant, preferably said amphoteric surfactant is selected from the group consisting of cocamidopropyl betaine, lauramidopropyl betaine, oleamidopropyl betaine, ricinoleamidopropyl betaine, cetyl betaine and dimer dilinoleamidopropyl betaine, sulfobetaines, hydroxysulfobetaines and sultaines, amine oxide. and mixtures thereof;
  d. a nonionic surfactant, preferably said nonionic surfactant is selected from the group consisting of polyoxyalkylene glycol alkyl ethers, alkyl ethoxylate, glucoside alkyl ethers, polyoxyalkylene glycol octylphenol ethers, polyoxyalkylene glycol alkylphenol ethers and mixtures thereof;
  e. mixtures thereof.

In one aspect of said fabric care composition, said material having the formula $Si(R_7)_mO(R_8)_j$ is selected from a monoalkoxysilane, a monoacetoxysilane, a dialkoxysilane, a diacetoxysilane, a trialkoxysilane, a triacetoxysilane, a tetraalkoxysilane, a tetraacetoxysilane and mixtures thereof.

In one aspect of said fabric care composition:
  a. said monoalkoxysilane is selected from the group consisting of Methoxytrimethylsilane, Ethoxytrimethylsilane, (3-Aminopropyl) ethoxydimethylsilane, (3-Aminopropyl)methoxydimethylsilane, 2-(Trimethylsiloxy)-1-aminoethane, and mixtures thereof;
  b. said monoacetoxysilane is acetoxytrimethylsilane;
  c. said dialkoxysilane is selected from the group consisting of Dimethoxydimethylsilane, 2-Aminoethyl-3-aminopropylmethyldimethoxysilane, Dimethyldiethoxysilane, (3-Aminopropyl)methyldiethoxysilane, 3-Aminopropylmethyldimethoxysilane and mixtures thereof;
  d. said diacetoxysilane is Diacetoxydimethylsilane;
  e. said trialkoxysilane is selected from the group consisting of (3-Aminopropyl)triethoxysilane, (3-Aminopropyl)trimethoxysilane, 3-(N-Aminoethyl)aminopropyltrimethoxysilane, Methyltrimethoxysilane, Methyltriethoxysilane, (Aminomethyl)trimethoxysilane and (Diethylamino)methyltriethoxysilane, and mixtures thereof;
  f. said triacetoxysilane is selected from the group consisting of Triacetoxymethylsilane, Triacetoxyethylsilane and mixtures thereof; and
  g. said tetraalkoxysilane is selected from the group consisting of tetramethoxysilane, tetraethoxysilane, and mixtures thereof.

In one aspect of said fabric care composition, said fabric care composition, based on total fabric care composition weight, comprises less than 2% of a material that comprises an aldehyde and/or ketone group.

In one aspect of said fabric care composition, said surfactant is selected from linear or branched alkyl benzene sulfonate, alkyl sulfate, alkyl ethoxy sulfate, alkyl ethoxylate, alkyl glyceryl sulfonate, quaternary ammonium surfactant, ester quaternary ammonium compound and mixtures thereof.

In one aspect of said fabric care composition said fabric care composition comprises an adjunct selected from the group consisting of delivery enhancing agents, fluorescent whitening agents, enzymes, rheology modifiers, builders, and mixtures thereof.

In one aspect of said fabric care composition, said fabric care composition comprises a delivery enhancing agent.

In one aspect of said fabric care composition said delivery enhancing agent comprises a cationic polymer with a net cationic charge density of from about 0.05 meq/g to about 23 meq/g.

In one aspect of said fabric care composition said delivery enhancing agent is a cationic polymer with a net cationic charge density of from about 0.05 meq/g to about 23 meq/g.

In one aspect of said fabric care composition said fabric care composition comprises 0.01% to about 0.3% by weight of a stabilizer.

In one aspect of said fabric care composition said stabilizer comprises a crystalline, hydroxyl-containing stabilizer.

In one aspect of said fabric care composition said stabilizer is a crystalline, hydroxyl-containing stabilizer.

In one aspect of said fabric care composition, said fabric care composition is in the form of a rinse-added composition.

In one aspect of said fabric care composition, said fabric care composition is a laundry detergent.

In one aspect of said fabric care composition, said fabric care composition has a recovery Index ($I_R$) of at least 1.1, preferably from about 1.1 to about 2.2, preferably from about 1.2 to about 1.8.

Methods & Treated Situs

In one aspect, a method of providing a benefit to a fabric comprising contacting the fabric with a fabric care composition selected from the group consisting of the fabric care compositions disclosed herein and mixtures thereof is disclosed.

In one aspect, of said method said fabric is in the form of a finished garment and said garment is contacted with said fabric care composition after said garment is transferred or sold to a consumer.

In one aspect, a situs, comprising a condensation product of an organosiloxane polymer comprising at least one repeat unit having Formula (I) above is disclosed. Preferably said situs comprises from about 20 microgram polymer per gram situs to about 0.1 gram polymer per gram of situs, more preferably said situs comprises from about 100 microgram polymer per gram situs to about 3,000 microgram polymer per gram of situs, preferably said situs is a fabric and/or garment.

Adjunct Ingredients

Detersive Surfactant.

The detersive surfactant typically comprises anionic detersive surfactant and non-ionic surfactant, wherein preferably the weight ratio of anionic detersive surfactant to non-ionic detersive surfactant is greater than 1:1, preferably greater than 1.5:1, or even greater than 2:1, or even greater than 2.5:1, or greater than 3:1.

The composition preferably comprises detersive surfactant, preferably from 10 wt % to 40 wt %, preferably from 12 wt %, or from 15 wt %, or even from 18 wt % detersive surfactant. Preferably, the surfactant comprises alkyl benzene sulphonate and one or more detersive co-surfactants. The surfactant preferably comprises $C_{10}$-$C_{13}$ alkyl benzene sulphonate and one or more co-surfactants. The co-surfactants preferably are selected from the group consisting of $C_{12}$-$C_{18}$ alkyl ethoxylated alcohols, preferably having an average degree of ethoxylation of from 1 to 7; $C_{12}$-$C_{18}$ alkyl ethoxylated sulphates, preferably having an average degree of ethoxylation of from 1 to 5; and mixtures thereof. However, other surfactant systems may be suitable for use in the present invention.

Suitable detersive surfactants include anionic detersive surfactants, nonionic detersive surfactants, cationic detersive surfactants, zwitterionic detersive surfactants, amphoteric detersive surfactants and mixtures thereof.

Suitable anionic detersive surfactants include: alkyl sulphates; alkyl sulphonates; alkyl phosphates; alkyl phosphonates; alkyl carboxylates; and mixtures thereof. The anionic surfactant can be selected from the group consisting of: $C_{10}$-$C_{18}$ alkyl benzene sulphonates (LAS) preferably $C_{10}$-$C_{13}$ alkyl benzene sulphonates; $C_{10}$-$C_{20}$ primary, branched chain, linear-chain and random-chain alkyl sulphates (AS), typically having the following formula:

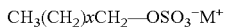

CH$_3$(CH$_2$)$_x$CH$_2$—OSO$_3^-$M$^+$ wherein, M is hydrogen or a cation which provides charge neutrality, preferred cations are sodium and ammonium cations, wherein x is an integer of at least 7, preferably at least 9; $C_{10}$-$C_{18}$ secondary (2,3) alkyl sulphates, typically having the following formulae:

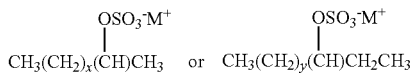

$$\underset{CH_3(CH_2)_x(CH)CH_3}{OSO_3^-M^+} \quad or \quad \underset{CH_3(CH_2)_y(CH)CH_2CH_3}{OSO_3^-M^+}$$

wherein, M is hydrogen or a cation which provides charge neutrality, preferred cations include sodium and ammonium cations, wherein x is an integer of at least 7, preferably at least 9, y is an integer of at least 8, preferably at least 9; $C_{10}$-$C_{18}$ alkyl alkoxy carboxylates; mid-chain branched alkyl sulphates; modified alkylbenzene sulphonate (MLAS); methyl ester sulphonate (MES); alpha-olefin sulphonate (AOS) and mixtures thereof.

Preferred anionic detersive surfactants include: linear or branched, substituted or unsubstituted alkyl benzene sulphonate detersive surfactants, preferably linear $C_{8}$-$C_{18}$ alkyl benzene sulphonate detersive surfactants; linear or branched, substituted or unsubstituted alkyl benzene sulphate detersive surfactants; linear or branched, substituted or unsubstituted alkyl sulphate detersive surfactants, including linear $C_{8}$-$C_{18}$ alkyl sulphate detersive surfactants, $C_{1}$-$C_{3}$ alkyl branched $C_{8}$-$C_{18}$ alkyl sulphate detersive surfactants, linear or branched alkoxylated $C_{8}$-$C_{18}$ alkyl sulphate detersive surfactants and mixtures thereof; linear or branched, substituted or unsubstituted alkyl sulphonate detersive surfactants; and mixtures thereof.

Preferred alkoxylated alkyl sulphate detersive surfactants are linear or branched, substituted or unsubstituted $C_{8-18}$ alkyl alkoxylated sulphate detersive surfactants having an average degree of alkoxylation of from 1 to 30, preferably from 1 to 10. Preferably, the alkoxylated alkyl sulphate detersive surfactant is a linear or branched, substituted or unsubstituted $C_{8-18}$ alkyl ethoxylated sulphate having an average degree of ethoxylation of from 1 to 10. Most preferably, the alkoxylated alkyl sulphate detersive surfactant is a linear unsubstituted $C_{8-18}$ alkyl ethoxylated sulphate having an average degree of ethoxylation of from 3 to 7.

Preferred anionic detersive surfactants are selected from the group consisting of: linear or branched, substituted or unsubstituted, $C_{12-18}$ alkyl sulphates; linear or branched, substituted or unsubstituted, $C_{10-13}$ alkylbenzene sulphonates, preferably linear $C_{10-13}$ alkylbenzene sulphonates; and mixtures thereof. Highly preferred are linear $C_{10-13}$ alkylbenzene sulphonates. Highly preferred are linear $C_{10-13}$ alkylbenzene sulphonates that are obtainable, preferably obtained, by sulphonating commercially available linear alkyl benzenes (LAB); suitable LAB include low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable.

Another suitable anionic detersive surfactant is alkyl ethoxy carboxylate.

The anionic detersive surfactants are typically present in their salt form, typically being complexed with a suitable cation. Suitable counter-ions include Na$^+$ and K$^+$, substituted ammonium such as $C_{1}$-$C_{6}$ alkanolammnonium preferably mono-ethanolamine (MEA) tri-ethanolamine (TEA), di-ethanolamine (DEA), and any mixtures thereof.

However, preferably at least 20 wt %, or at least 30 wt %, or at least 40 wt %, or at least 50 wt %, or at least 60 wt %, or at least 70 wt %, or at least 80 wt %, or even or at least 90 wt % of the anionic detersive surfactant is neutralized by a sodium cation.

It may also be preferred for the anionic detersive surfactant to have a hydrophilic index (HI$_C$) of from 8.0 to 9.1, or it may even be preferred for the anionic detersive surfactant to have a lower hydrophilic index (HI$_C$), such as one in the range of from 6.0 to 8.0, or from 7.0 to below 8.0. The hydrophilic index (HI$_C$) is described in more detail in WO00/27958.

Suitable cationic detersive surfactants include: alkyl pyridinium compounds; alkyl quaternary ammonium compounds; alkyl quaternary phosphonium compounds; alkyl ternary sulphonium compounds; and mixtures thereof. The cationic detersive surfactant can be selected from the group consisting of: alkoxylate quaternary ammonium (AQA) surfactants; dimethyl hydroxyethyl quaternary ammonium; polyamine cationic surfactants; cationic ester surfactants; amino surfactants, specifically amido propyldimethyl amine; and mixtures thereof. Preferred cationic detersive surfactants are quaternary ammonium compounds having the general formula:

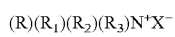

(R)(R$_1$)(R$_2$)(R$_3$)N$^+$X$^-$ wherein, R is a linear or branched, substituted or unsubstituted $C_{6-18}$ alkyl or alkenyl moiety, R$_1$ and R$_2$ are independently selected from methyl or ethyl moieties, $R_3$ is a hydroxyl, hydroxymethyl or a hydroxyethyl moiety, X is an anion which provides charge neutrality, preferred anions include halides (such as chloride), sulphate and sulphonate. Preferred cationic detersive surfactants are mono-$C_{6-18}$ alkyl mono-hydroxyethyl di-methyl quaternary ammonium chlorides. Highly preferred cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Suitable non-ionic detersive surfactant can be selected from the group consisting of: $C_8$-$C_{18}$ alkyl ethoxylates, such as, NEODOL® non-ionic surfactants from Shell; $C_6$-$C_{12}$ alkyl phenol alkoxylates wherein the alkoxylate units are ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols, BA; $C_{14}$-$C_{22}$ mid-chain branched alkyl alkoxylates, BAEx, wherein x=from 1 to 30; alkylpolysaccharides, specifically alkylpolyglycosides; polyhydroxy fatty acid amides; ether capped poly(oxyalkylated) alcohol surfactants; and mixtures thereof.

The non-ionic detersive surfactant could be an alkyl polyglucoside and/or an alkyl alkoxylated alcohol. Preferably the non-ionic detersive surfactant is a linear or branched, substituted or unsubstituted $C_{8-18}$ alkyl ethoxylated alcohol having an average degree of ethoxylation of from 1 to 10, more preferably from 3 to 7.

Suitable zwitterionic and/or amphoteric detersive surfactants include alkanolamine sulpho-betaines.

It may be preferred for the composition to comprise branched anionic detersive surfactant and/or branched non-ionic detersive surfactant. Preferably, the branched anionic detersive surfactant and/or branched non-ionic detersive surfactant are derived from natural sources, preferably wherein the natural sources include bio-derived isoprenoids, most preferably farnescene.

Surfactancy Boosting Polymer.

The composition may comprise a surfactancy boosting polymer. Preferred polymers are amphiphilic alkoxylated grease cleaning polymers and/or random graft co-polymers. These polymers are described in more detail below.

Amphiphilic Alkoxylated Grease Cleaning Polymer.

Amphiphilic alkoxylated grease cleaning polymers refer to any alkoxylated polymers having balanced hydrophilic and hydrophobic properties such that they remove grease particles from fabrics and surfaces. Specific embodiments of the amphiphilic alkoxylated grease cleaning polymers of the present invention comprise a core structure and a plurality of alkoxylate groups attached to that core structure.

The core structure may comprise a polyalkylenimine structure comprising, in condensed form, repeating units of formulae (I), (II), (III) and (IV):

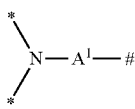

(I)

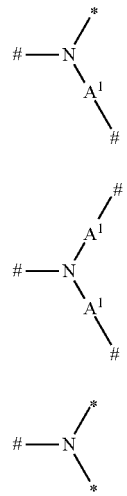

wherein # in each case denotes one-half of a bond between a nitrogen atom and the free binding position of a group $A^1$ of two adjacent repeating units of formulae (I), (II), (III) or (IV); * in each case denotes one-half of a bond to one of the alkoxylate groups; and $A^1$ is independently selected from linear or branched $C_2$-$C_6$-alkylene; wherein the polyalkylenimine structure consists of 1 repeating unit of formula (I), x repeating units of formula (II), y repeating units of formula (III) and y+1 repeating units of formula (IV), wherein x and y in each case have a value in the range of from 0 to about 150; where the average weight average molecular weight, Mw, of the polyalkylenimine core structure is a value in the range of from about 60 to about 10,000 g/mol.

The core structure may alternatively comprise a polyalkanolamine structure of the condensation products of at least one compound selected from N-(hydroxyalkyl)amines of formulae (I.a) and/or (I.b),

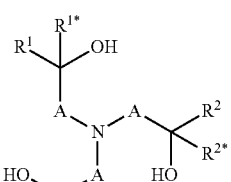

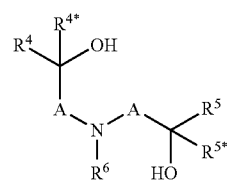

wherein A are independently selected from $C_1$-$C_6$-alkylene; $R^1$, $R^{1*}$, $R^2$, $R^{2*}$, $R^3$, $R^{3*}$, $R^4$, $R^{4*}$, $R^5$ and $R^{5*}$ are independently selected from hydrogen, alkyl, cycloalkyl or aryl, wherein the last three mentioned radicals may be optionally substituted; and $R^6$ is selected from hydrogen, alkyl, cycloalkyl or aryl, wherein the last three mentioned radicals may be optionally substituted.

The plurality of alkylenoxy groups attached to the core structure are independently selected from alkylenoxy units of the formula (V)

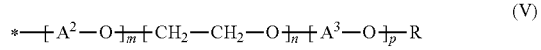

wherein * in each case denotes one-half of a bond to the nitrogen atom of the repeating unit of formula (I), (II) or (IV); $A^2$ is in each case independently selected from 1,2-propylene, 1,2-butylene and 1,2-isobutylene; $A^3$ is 1,2-propylene; R is in each case independently selected from hydrogen and $C_1$-$C_4$-alkyl; m has an average value in the range of from 0 to about 2; n has an average value in the range of from about 20 to about 50; and p has an average value in the range of from about 10 to about 50.

Specific embodiments of the amphiphilic alkoxylated grease cleaning polymers may be selected from alkoxylated polyalkylenimines having an inner polyethylene oxide block and an outer polypropylene oxide block, the degree of ethoxylation and the degree of propoxylation not going above or below specific limiting values. Specific embodiments of the alkoxylated polyalkylenimines according to the present invention have a minimum ratio of polyethylene blocks to polypropylene blocks (n/p) of about 0.6 and a maximum of about $1.5(x+2y+1)^{1/2}$. Alkoxykated polyalkyenimines having an n/p ratio of from about 0.8 to about $1.2(x+2y+1)^{1/2}$ have been found to have especially beneficial properties.

The alkoxylated polyalkylenimines according to the present invention have a backbone which consists of primary, secondary and tertiary amine nitrogen atoms which are attached to one another by alkylene radicals A and are randomly arranged. Primary amino moieties which start or terminate the main chain and the side chains of the polyalkylenimine backbone and whose remaining hydrogen atoms are subsequently replaced by alkylenoxy units are referred to as repeating units of formulae (I) or (IV), respectively. Secondary amino moieties whose remaining hydrogen atom is subsequently replaced by alkylenoxy units are referred to as repeating units of formula (II). Tertiary amino moieties which branch the main chain and the side chains are referred to as repeating units of formula (III).

Since cyclization can occur in the formation of the polyalkylenimine backbone, it is also possible for cyclic amino moieties to be present to a small extent in the backbone. Such polyalkylenimines containing cyclic amino moieties are of course alkoxylated in the same way as those consisting of the noncyclic primary and secondary amino moieties.

The polyalkylenimine backbone consisting of the nitrogen atoms and the groups $A^1$, has an average molecular weight Mw of from about 60 to about 10,000 g/mole, preferably from about 100 to about 8,000 g/mole and more preferably from about 500 to about 6,000 g/mole.

The sum (x+2y+1) corresponds to the total number of alkylenimine units present in one individual polyalkylenimine backbone and thus is directly related to the molecular weight of the polyalkylenimine backbone. The values given in the specification however relate to the number average of all polyalkylenimines present in the mixture. The sum (x+2y+2) corresponds to the total number amino groups present in one individual polyalkylenimine backbone.

The radicals $A^1$ connecting the amino nitrogen atoms may be identical or different, linear or branched $C_2$-$C_6$-alkylene radicals, such as 1,2-ethylene, 1,2-propylene, 1,2-butylene, 1,2-isobutylene, 1,2-pentanediyl, 1,2-hexanediyl or hexamethylene. A preferred branched alkylene is 1,2-propylene. Preferred linear alkylene are ethylene and hexamethylene. A more preferred alkylene is 1,2-ethylene.

The hydrogen atoms of the primary and secondary amino groups of the polyalkylenimine backbone are replaced by alkylenoxy units of the formula (V).

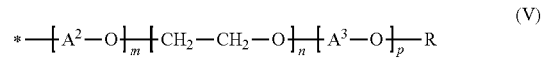

In this formula, the variables preferably have one of the meanings given below:

$A^2$ in each case is selected from 1,2-propylene, 1,2-butylene and 1,2-isobutylene; preferably $A^2$ is 1,2-propylene. $A^3$ is 1,2-propylene; R in each case is selected from hydrogen and $C_1$-$C_4$-alkyl, such as methyl, ethyl, n-propyl, isopropyl, n-butyl, isobutyl and tert.-butyl; preferably R is hydrogen. The index m in each case has a value of 0 to about 2; preferably m is 0 or approximately 1; more preferably m is 0. The index n has an average value in the range of from about 20 to about 50, preferably in the range of from about 22 to about 40, and more preferably in the range of from about 24 to about 30. The index p has an average value in the range of from about 10 to about 50, preferably in the range of from about 11 to about 40, and more preferably in the range of from about 12 to about 30.

Preferably the alkylenoxy unit of formula (V) is a non-random sequence of alkoxylate blocks. By non-random sequence it is meant that the $[-A^2-O-]_m$ is added first (i.e., closest to the bond to the nitrogen atom of the repeating unit of formula (I), (II), or (III)), the $[-CH_2-CH_2-O-]_n$ is added second, and the $[-A^3-O-]_p$ is added third. This orientation provides the alkoxylated polyalkylenimine with an inner polyethylene oxide block and an outer polypropylene oxide block.

The substantial part of these alkylenoxy units of formula (V) is formed by the ethylenoxy units $-[CH_2-CH_2-O)]_n-$ and the propylenoxy units $-[CH_2-CH_2(CH_3)-O]_p-$. The alkylenoxy units may additionally also have a small proportion of propylenoxy or butylenoxy units $-[A^2-O]_m-$, i.e. the polyalkylenimine backbone saturated with hydrogen atoms may be reacted initially with small amounts of up to about 2 mol, especially from about 0.5 to about 1.5 mol, in particular from about 0.8 to about 1.2 mol, of propylene oxide or butylene oxide per mole of NH— moieties present, i.e. incipiently alkoxylated.

This initial modification of the polyalkylenimine backbone allows, if necessary, the viscosity of the reaction mixture in the alkoxylation to be lowered. However, the modification generally does not influence the performance properties of the alkoxylated polyalkylenimine and therefore does not constitute a preferred measure.

The amphiphilic alkoxylated grease cleaning polymers are present in the detergent and cleaning compositions of the present invention at levels ranging from about 0.05% to 10% by weight of the composition. Embodiments of the compositions may comprise from about 0.1% to about 5% by weight. More specifically, the embodiments may comprise from about 0.25 to about 2.5% of the grease cleaning polymer.

Random Graft Co-Polymer.

Suitable random graft co-polymers typically comprise: (i) hydrophilic backbone comprising monomers selected from the group consisting of: unsaturated $C_1$-$C_6$ carboxylic acids, ethers, alcohols, aldehydes, ketones, esters, sugar units, alkoxy units, maleic anhydride, saturated polyalcohols such as glycerol, and mixtures thereof; and (ii) hydrophobic side chain(s) selected from the group consisting of: $C_4$-$C_{25}$ alkyl group, polypropylene, polybutylene, vinyl ester of a saturated $C_1$-$C_6$ mono-carboxylic acid, $C_1$-$C_6$ alkyl ester of acrylic or methacrylic acid, and mixtures thereof.

The polymer preferably has the general formula:

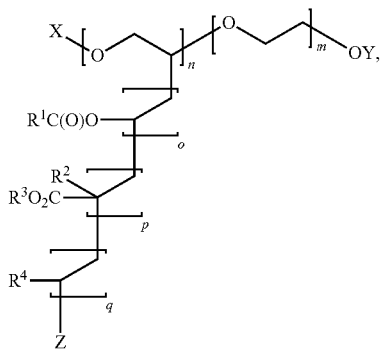

wherein X, Y and Z are capping units independently selected from H or a $C_{1-6}$ alkyl; each $R^1$ is independently selected from methyl and ethyl; each $R^2$ is independently selected from H and methyl; each $R^3$ is independently a $C_{1-4}$ alkyl; and each $R^4$ is independently selected from pyrrolidone and phenyl groups. The weight average molecular weight of the polyethylene oxide backbone is typically from about 1,000 g/mol to about 18,000 g/mol, or from about 3,000 g/mol to about 13,500 g/mol, or from about 4,000 g/mol to about 9,000 g/mol. The value of m, n, o, p and q is selected such that the pendant groups comprise, by weight of the polymer at least 50%, or from about 50% to about 98%, or from about 55% to about 95%, or from about 60% to about 90%. The polymer useful herein typically has a weight average molecular weight of from about 1,000 to about 100,000 g/mol, or preferably from about 2,500 g/mol to about 45,000 g/mol, or from about 7,500 g/mol to about 33,800 g/mol, or from about 10,000 g/mol to about 22,500 g/mol.

Other Polymers.

The composition preferably comprises polymer in addition to the surfactancy boosting polymers. Suitable other polymers include soil release polymers, anti-redeposition polymers, carboxylate polymers and/or deposition aid polymers. Other suitable polymers include dye transfer inhibitors, such as polyvinyl pyrrolidone polymer, polyamine N-oxide polymer, co-polymer of N-vinylpyrrolidone and N-vinylimidazole polymers.

Soil Release Polymers.

Suitable soil release polymers include polymers comprising at least one monomer unit selected from saccharide, dicarboxylic acid, polyol and combinations thereof, in random or block configuration. Other suitable soil release polymers include ethylene terephthalate-based polymers and co-polymers thereof, preferably co-polymers of ethylene terephthalate and polyethylene oxide in random or block configuration.

Anti-Redeposition Polymers.

The composition may comprise anti-redeposition polymer, preferably from 0.1 wt % to 10 wt % anti-redeposition polymer. Suitable anti-redeposition polymers include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof. Suitable carboxylate polymers include.

Other suitable anti-redeposition polymers include polyethylene glycol, preferably having a molecular weight in the range of from 500 to 100,000 Da.

Carboxylate Polymers.

It may be preferred for the composition to comprise from above 0 wt % to 5 wt %, by weight of the composition, of polymeric carboxylate. The polymeric carboxylate can sequester free calcium ions in the wash liquor. The carboxylate polymers can also act as soil dispersants and can provide an improved particulate stain removal cleaning benefit.

The composition preferably comprises polymeric carboxylate. Preferred polymeric carboxylates include: polyacrylates, preferably having a weight average molecular weight of from 1,000 Da to 20,000 Da; co-polymers of maleic acid and acrylic acid, preferably having a molar ratio of maleic acid monomers to acrylic acid monomers of from 1:1 to 1:10 and a weight average molecular weight of from 10,000 Da to 200,000 Da, or preferably having a molar ratio of maleic acid monomers to acrylic acid monomers of from 0.3:1 to 3:1 and a weight average molecular weight of from 1,000 Da to 50,000 Da.

Deposition Aids.

The composition may comprise deposition aid. Suitable deposition aids are polysaccharides, preferably cellulosic polymers. Other suitable deposition aids include poly diallyl dimethyl ammonium halides (DADMAC), and co-polymers of DADMAC with vinyl pyrrolidone, acrylamides, imidazoles, imidazolinium halides, and mixtures thereof, in random or block configuration. Other suitable deposition aids include cationic guar gum, cationic cellulose such as cationic hydoxyethyl cellulose, cationic starch, cationic polyacylamides, and mixtures thereof.

Non-Polymeric Dye Transfer Inhibitors.

Non-polymeric dye transfer inhibitors may also be used, such as manganese phthalocyanine, peroxidases, and mixtures thereof.

Chelant.

Chelant may be but are not limited to the following: ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetracetic acid (PDTA); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid; and any salts thereof.

The chelant are typically present at a level of from 0.1 wt % to 10 wt % by weight in the composition. The chelant may be in form of a solid particle that is suspended in the liquid composition.

Hueing Dyes.

The composition may comprise a fabric hueing agent (sometimes referred to as shading, bluing or whitening agents). Typically the hueing agent provides a blue or violet shade to fabric. Hueing agents can be used either alone or in combination to create a specific shade of hueing and/or to shade different fabric types. This may be provided for example by mixing a red and green-blue dye to yield a blue or violet shade. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Suitable fabric hueing agents include dyes, dye-clay conjugates, and organic and inorganic pigments. Suitable dyes include small molecule dyes and polymeric dyes. Suitable small molecule dyes include small molecule dyes selected from the group consisting of dyes falling into the Colour Index (C.I.) classifications of Direct, Basic, Reactive or hydrolysed Reactive, Solvent or Disperse dyes for example that are classified as Blue, Violet, Red, Green or Black, and provide the desired shade either alone or in combination. In another aspect, suitable small molecule dyes include small molecule dyes selected from the group consisting of Colour Index (Society of Dyers and Colourists, Bradford, UK) numbers Direct Violet dyes such as 9, 35, 48, 51, 66, and 99, Direct Blue dyes such as 1, 71, 80 and 279, Acid Red dyes such as 17, 73, 52, 88 and 150, Acid Violet dyes such as 15, 17, 24, 43, 49 and 50, Acid Blue dyes such as 15, 17, 25, 29, 40, 45, 75, 80, 83, 90 and 113, Acid Black dyes such as 1, Basic Violet dyes such as 1, 3, 4, 10 and 35, Basic Blue dyes such as 3, 16, 22, 47, 66, 75 and 159, Disperse or Solvent dyes, and mixtures thereof. In another aspect, suitable small molecule dyes include small molecule dyes selected from the group consisting of C. I. numbers Acid Violet 17, Direct Blue 71, Direct Violet 51, Direct Blue 1, Acid Red 88, Acid Red 150, Acid Blue 29, Acid Blue 113 or mixtures thereof.

Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof.

In another aspect, suitable polymeric dyes include polymeric dyes selected from the group consisting of fabric-substantive colorants sold under the name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® Violet CT, carboxymethyl cellulose (CMC) covalently bound to a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

Preferred hueing dyes include the whitening agents. Preferred hueing agents for use in the present invention may be the preferred dyes disclosed in these references, including those selected from Examples 1-42 in Table 5 of WO2011/011799. Other preferred dyes are disclosed in U.S. Pat. No. 8,138,222. Other preferred dyes are disclosed in WO2009/069077.

Suitable dye clay conjugates include dye clay conjugates selected from the group comprising at least one cationic/basic dye and a smectite clay, and mixtures thereof. In another aspect, suitable dye clay conjugates include dye clay conjugates selected from the group consisting of one cationic/basic dye selected from the group consisting of C.I. Basic Yellow 1 through 108, C.I. Basic Orange 1 through 69, C.I. Basic Red 1 through 118, C.I. Basic Violet 1 through 51, C.I. Basic Blue 1 through 164, C.I. Basic Green 1 through 14, C.I. Basic Brown 1 through 23, CI Basic Black 1 through 11, and a clay selected from the group consisting of Montmorillonite clay, Hectorite clay, Saponite clay and mixtures thereof. In still another aspect, suitable dye clay conjugates include dye clay conjugates selected from the group consisting of: Montmorillonite Basic Blue B7 C.I. 42595 conjugate, Montmorillonite Basic Blue B9 C.I. 52015 conjugate, Montmorillonite Basic Violet V3 C.I. 42555 conjugate, Montmorillonite Basic Green G1 C.I. 42040 conjugate, Montmorillonite Basic Red R1 C.I. 45160 conjugate, Montmorillonite C.I. Basic Black 2 conjugate, Hectorite Basic Blue B7 C.I. 42595 conjugate, Hectorite Basic Blue B9 C.I. 52015 conjugate, Hectorite Basic Violet V3 C.I. 42555 conjugate, Hectorite Basic Green G1 C.I. 42040 conjugate, Hectorite Basic Red R1 C.I. 45160 conjugate, Hectorite C.I. Basic Black 2 conjugate, Saponite Basic Blue B7 C.I. 42595 conjugate, Saponite Basic Blue B9 C.I. 52015 conjugate, Saponite Basic Violet V3 C.I. 42555 conjugate, Saponite Basic Green G1 C.I. 42040 conjugate, Saponite Basic Red R1 C.I. 45160 conjugate, Saponite C.I. Basic Black 2 conjugate and mixtures thereof.

Suitable pigments include pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by C1-C3-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof.

In another aspect, suitable pigments include pigments selected from the group consisting of Ultramarine Blue (C.I. Pigment Blue 29), Ultramarine Violet (C.I. Pigment Violet 15) and mixtures thereof.

The aforementioned fabric hueing agents can be used in combination (any mixture of fabric hueing agents can be used).

Enzymes.

The composition preferably comprises enzyme. Preferably, the composition comprises a relatively high level of enzymes. Most preferably, the composition comprises at least 0.01 wt % active enzyme. It may be preferred for the composition to comprise at least 0.03 wt % active enzyme.

It may be preferred for the composition to comprise at least a ternary enzyme system selected from protease, amylase, lipase and/or cellulase.

Lipase.

Suitable lipases include those of bacterial or fungal origin. Chemically modified or protein engineered mutants are included. Examples of useful lipases include lipases from *Humicola* (synonym *Thermomyces*), e.g., from *H. lanuginosa* (*T. lanuginosus*) or from *H. insolens*, a *Pseudomonas* lipase, e.g., from *P. alcaligenes* or *P. pseudoalcaligenes, P.*

*cepacia, P. stutzeri, P. fluorescens, Pseudomonas* sp. strain SD 705, *P. wisconsinensis*, a *Bacillus* lipase, e.g., from *B. subtilis, B. stearothermophilus* or *B. pumilus*.

The lipase may be a "first cycle lipase". In one aspect, the lipase is a first-wash lipase, preferably a variant of the wild-type lipase from *Thermomyces lanuginosus* comprising T231R and N233R mutations. The wild-type sequence is the 269 amino acids (amino acids 23-291) of the Swissprot accession number Swiss-Prot 059952 (derived from *Thermomyces lanuginosus* (*Humicola lanuginosa*)). Preferred lipases would include those sold under the tradenames Lipex®, Lipolex® and Lipoclean® by Novozymes, Bagsvaerd, Denmark.

Preferably, the composition comprises a variant of *Thermomyces lanuginosa* lipase having >90% identity with the wild type amino acid and comprising substitution(s) at T231 and/or N233, preferably T231R and/or N233R (herein: "first wash lipase").

Protease.

Suitable proteases include metalloproteases and/or serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii*.

(b) trypsin-type or chymotrypsin-type proteases, such as trypsin (e.g., of porcine or bovine origin), including the *Fusarium* protease and the chymotrypsin proteases derived from Cellumonas.

(c) metalloproteases, including those derived from *Bacillus amyloliquefaciens*.

Preferred proteases include those derived from *Bacillus gibsonii* or *Bacillus Lentus*.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Properase®, Purafect®, Purafect Prime®, Purafect Ox®, FN3®, FN4®, Excellase® and Purafect OXP® by Genencor International, those sold under the tradename Opticlean® and Optimase® by Solvay Enzymes, those available from Henkel/Kemira, namely BLAP (with the following mutations S99D+S101 R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)—all from Henkel/Kemira; and KAP (*Bacillus alkalophilus* subtilisin with mutations A230V+S256G+S259N) from Kao.

Preferably, the composition comprises a subtilisin protease selected from BLAP, BLAP R, BLAP X or BLAP F49.

Cellulase.

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum*.

In one aspect, the cellulase can include microbial-derived endoglucanases exhibiting endo-beta-1,4-glucanase activity (E.C. 3.2.1.4). A suitable endoglucanases is sold under the tradename Celluclean® (Novozymes A/S, Bagsvaerd, Denmark). Further suitable endoglucanases are variants of the XYG1006 enzyme (Novozymes). A suitable endoglucanase is sold under the tradename Whitezyme® (Novozymes A/S, Bagsvaerd, Denmark).

Preferably, the composition comprises a cleaning cellulase belonging to Glycosyl Hydrolase family 45 having a molecular weight of from 17 kDa to 30 kDa, for example the endoglucanases sold under the tradename Biotouch® NCD, DCC and DCL (AB Enzymes, Darmstadt, Germany).

Amylase.

Preferably, the composition comprises an amylase with greater than 60% identity to the AA560 alpha amylase endogenous to *Bacillus* sp. DSM 12649, preferably a variant of the AA560 alpha amylase endogenous to *Bacillus* sp. DSM 12649 having:

(a) mutations at one or more of positions 9, 26, 149. 182, 186, 202, 257, 295, 299, 323, 339 and 345; and (b) optionally with one or more, preferably all of the substitutions and/or deletions in the following positions: 118, 183, 184, 195, 320 and 458, which if present preferably comprise R118K, D183*, G184*, N195F, R320K and/or R458K.

Suitable commercially available amylase enzymes include Stainzyme® Plus, Stainzyme®, Natalase, Termamyl®, Termamyl® Ultra, Liquezyme® SZ (all Novozymes, Bagsvaerd, Denmark) and Spezyme® AA or Ultraphlow (Genencor, Palo Alto, USA).

Choline Oxidase.

Preferably, the composition comprises a choline oxidase enzyme such as the 59.1 kDa choline oxidase enzyme endogenous to *Arthrobacter nicotianae*.

Other Enzymes.

Other suitable enzymes are peroxidases/oxidases, which include those of plant, bacterial or fungal origin. Chemically modified or protein engineered mutants are included. Examples of useful peroxidases include peroxidases from *Coprinus*, e.g., from *C. cinereus*, and variants thereof.

Commercially available peroxidases include GUARDZYME® (Novozymes A/S).

Other preferred enzymes include: pectate lyases sold under the tradenames Pectawash®, Pectaway®; mannanases sold under the tradenames Mannaway® (all from Novozymes A/S, Bagsvaerd, Denmark), and Purabrite® (Genencor International Inc., Palo Alto, Calif.); cutinases; phospholipases; and any mixture thereof.

Identity.

The relativity between two amino acid sequences is described by the parameter "identity". For purposes of the present invention, the alignment of two amino acid sequences is determined by using the Needle program from the EMBOSS package (http://emboss.org) version 2.8.0. The Needle program implements the global alignment algorithm described in Needleman, S. B. and Wunsch, C. D. (1970) J. Mol. Biol. 48, 443-453. The substitution matrix used is BLOSUM62, gap opening penalty is 10, and gap extension penalty is 0.5.

Enzyme Stabilizer.

The composition may comprise an enzyme stabilizer. Suitable enzyme stabilizers include polyols such as propylene glycol or glycerol, sugar or sugar alcohol, lactic acid, reversible protease inhibitor, boric acid, or a boric acid derivative, e.g., an aromatic borate ester, or a phenyl boronic acid derivative such as 4-formylphenyl boronic acid. It may be preferred for the composition to comprise a nil-boron enzyme stabilizer, preferably selected from polyols such as propylene glycol or glycerol, sugar or sugar alcohol. It may even be preferred for the composition to be substantially free of boron. By substantially free it is typically meant: "comprises no deliberately added". Free of boron also typically includes being free of sources of boron such as borax.

Calcium and Magnesium Cations.

Preferably, the composition comprises from at least 0.2 wt % to 5 wt % calcium and/or magnesium cations.

Visual Signaling Ingredients.

Suitable visual signaling ingredients include any reflective and/or refractive material, preferably mica.

Anti-Foam.

The detergent compositions herein comprise from about 0.001 wt % to about 4.0 wt % anti-foam selected from silicone anti-foam compounds; anti-foam compounds of silicone oils and hydrophobic particles; and mixtures thereof. In one embodiment, the compositions herein comprise from about 0.01 wt % to about 2.0 wt %, alternatively from 0.05 wt % to about 1.0 wt % silicone anti-foam (percentages by active amount not including any carrier).

In one embodiment, the anti-foam is selected from: organomodified silicone polymers with aryl or alkylaryl substituents combined with silicone resin and modified silica; M/Q resins; and mixtures thereof.

Fatty Acid.

The composition comprises from 0 wt % to 10 wt %, preferably from 0 wt % to 5 wt %, preferably from 0.1 wt % to 5 wt %, preferably from 0.5 wt % to 3 wt % saturated or unsaturated fatty acid, preferably saturated or unsaturated $C_{12}$-$C_{24}$ fatty acid; highly preferred are saturated $C_{12}$-$C_{18}$ fatty acid.

Structurant/Thickener.

Structured liquids can either be internally structured, whereby the structure is formed by primary ingredients (e.g. surfactant material) and/or externally structured by providing a three dimensional matrix structure using secondary ingredients (e.g. polymers, clay and/or silicate material).

The composition may comprise a structurant, preferably from 0.01 wt % to 5 wt %, from 0.1 wt % to 2.0 wt % structurant. The structurant is typically selected from the group consisting of diglycerides and triglycerides, ethylene glycol distearate, microcrystalline cellulose, cellulose-based materials, microfiber cellulose, biopolymers, xanthan gum, gellan gum, and mixtures thereof. A suitable structurant includes hydrogenated castor oil, and non-ethoxylated derivatives thereof. It may be preferred for the composition to substantially free of lipase, by substantially free it is typically meant: "comprises no deliberately added". This is especially preferred when the composition comprises hydrogenated castor oil, and non-ethoxylated derivatives thereof.

Ethylene glycol distearate can also be used as a visual signaling ingredient.

Solvent.

The composition preferably comprises solvent. Preferred solvents include alcohols and/or glycols, preferably methanol, ethanol and/or propylene glycol. Preferably, the composition comprises no or minimal amounts of methanol and ethanol and instead comprises relatively high amounts of propylene glycol, for improved enzyme stability. Preferably, the composition comprises propylene glycol.

Suitable solvents include $C_4$-$C_{14}$ ethers and diethers, glycols, alkoxylated glycols, $C_6$-$C_{16}$ glycol ethers, alkoxylated aromatic alcohols, aromatic alcohols, aliphatic branched alcohols, alkoxylated aliphatic branched alcohols, alkoxylated linear $C_1$-$C_5$ alcohols, linear $C_1$-$C_5$ alcohols, amines, $C_8$-$C_{14}$ alkyl and cycloalkyl hydrocarbons and halohydrocarbons, and mixtures thereof.

Preferred solvents are selected from methoxy octadecanol, 2-(2-ethoxyethoxyl)ethanol, benzyl alcohol, 2-ethylbutanol and/or 2-methylbutanol, 1-methylpropoxyethanol and/or 2-methylbutoxyethanol, linear $C_1$-$C_5$ alcohols such as methanol, ethanol, propanol, butyl diglycol ether (BDGE), butyltriglycol ether, tert-amyl alcohol, glycerol, isopropanol and mixtures thereof. Particularly preferred solvents which can be used herein are butoxy propoxy propanol, butyl diglycol ether, benzyl alcohol, butoxypropanol, propylene glycol, glycerol, ethanol, methanol, isopropanol and mixtures thereof. Other suitable solvents include propylene glycol and diethylene glycol and mixtures thereof.

Electrolytic Strength.

The electrolytic strength of the composition at a concentration of 1 g/l in de-ionized water and at a temperature of 25° C. in mScm$^{-1}$ is preferably less than 200 mScm$^{-1}$, more preferably less than 150 mScm$^{-1}$, even more preferably less than 100 mScm$^{-1}$, and even less than 75 mScm$^{-1}$, or even less than 50 mScm$^{-1}$. The electrolytic strength can be determined by any suitable means, such as conductivity meter.

Buffers.

The composition typically comprises buffer. Preferred buffers include mono-ethanolamine (MEA) and tri-ethanolamine (TEA). Borax may be used as a buffer, although preferably the composition is substantially free of borax, by substantially free it is typically meant no deliberately added borax is incorporated into the composition.

Alkanolammonium Cation.

Preferably, the composition comprises alkanolammonium cation, preferably mono-ethanolamine (MEA) and/or tri-ethanolamine (TEA).

Hydrotropes.

The composition may comprise hydrotrope. A preferred hydrotrope is monopropylene glycol.

Encapsulates

The composition may comprise an encapsulate. In one aspect, an encapsulate comprising a core, a shell having an inner and outer surface, said shell encapsulating said core.

In one aspect of said encapsulate, said core may comprise a material selected from the group consisting of perfumes; brighteners; dyes; insect repellants; silicones; waxes; flavors; vitamins; fabric softening agents; skin care agents in one aspect, paraffins; enzymes; anti-bacterial agents; bleaches; sensates; and mixtures thereof; and said shell may comprise a material selected from the group consisting of polyethylenes; polyamides; polyvinylalcohols, optionally containing other co-monomers; polystyrenes; polyisoprenes; polycarbonates; polyesters; polyacrylates; aminoplasts, in one aspect said aminoplast may comprise a polyureas, polyurethane, and/or polyureaurethane, in one aspect said polyurea may comprise polyoxymethyleneurea and/or melamine formaldehyde; polyolefins; polysaccharides, in one aspect said polysaccharide may comprise alginate and/or chitosan; gelatin; shellac; epoxy resins; vinyl polymers; water insoluble inorganics; silicone; and mixtures thereof.

In one aspect of said encapsulate, said core may comprise perfume.

In one aspect of said encapsulate, said shell may comprise melamine formaldehyde and/or cross linked melamine formaldehyde.

In a one aspect, suitable encapsulates may comprise a core material and a shell, said shell at least partially surrounding said core material, is disclosed. At least 75%, 85% or even 90% of said encapsulates may have a fracture strength of from about 0.2 MPa to about 10 MPa, from about 0.4 MPa to about 5 MPa, from about 0.6 MPa to about 3.5 MPa, or even from about 0.7 MPa to about 3 MPa; and a benefit agent leakage of from 0% to about 30%, from 0% to about 20%, or even from 0% to about 5%.

In one aspect, at least 75%, 85% or even 90% of said encapsulates may have a particle size of from about 1 microns to about 80 microns, about 5 microns to 60 microns, from about 10 microns to about 50 microns, or even from about 15 microns to about 40 microns.

In one aspect, at least 75%, 85% or even 90% of said encapsulates may have a particle wall thickness of from about 30 nm to about 250 nm, from about 80 nm to about 180 nm, or even from about 100 nm to about 160 nm.

In one aspect, said encapsulates' core material may comprise a material selected from the group consisting of a perfume raw material and/or optionally a material selected from the group consisting of vegetable oil, including neat and/or blended vegetable oils including caster oil, coconut oil, cottonseed oil, grape oil, rapeseed, soybean oil, corn oil, palm oil, linseed oil, safflower oil, olive oil, peanut oil, coconut oil, palm kernel oil, castor oil, lemon oil and mixtures thereof; esters of vegetable oils, esters, including dibutyl adipate, dibutyl phthalate, butyl benzyl adipate, benzyl octyl adipate, tricresyl phosphate, trioctyl phosphate and mixtures thereof; straight or branched chain hydrocarbons, including those straight or branched chain hydrocarbons having a boiling point of greater than about 80° C.; partially hydrogenated terphenyls, dialkyl phthalates, alkyl biphenyls, including monoisopropylbiphenyl, alkylated naphthalene, including dipropylnaphthalene, petroleum spirits, including kerosene, mineral oil and mixtures thereof; aromatic solvents, including benzene, toluene and mixtures thereof; silicone oils; and mixtures thereof.

In one aspect, said encapsulates' wall material may comprise a suitable resin including the reaction product of an aldehyde and an amine, suitable aldehydes include, formaldehyde. Suitable amines include melamine, urea, benzoguanamine, glycoluril, and mixtures thereof. Suitable melamines include, methylol melamine, methylated methylol melamine, imino melamine and mixtures thereof. Suitable ureas include, dimethylol urea, methylated dimethylol urea, urea-resorcinol, and mixtures thereof.

In one aspect, suitable formaldehyde scavengers may be employed with the encapsulates, for example, in a capsule slurry and/or added to a consumer product before, during or after the encapsulates are added to such consumer product.

Suitable capsules can be purchased from Appleton Papers Inc. of Appleton, Wis. USA.

In addition, the materials for making the aforementioned encapsulates can be obtained from Solutia Inc. (St Louis, Mo. U.S.A.), Cytec Industries (West Paterson, N.J. U.S.A.), sigma-Aldrich (St. Louis, Mo. U.S.A.), CP Kelco Corp. of San Diego, Calif., USA; BASF AG of Ludwigshafen, Germany; Rhodia Corp. of Cranbury, N.J., USA; Hercules Corp. of Wilmington, Del., USA; Agrium Inc. of Calgary, Alberta, Canada, ISP of New Jersey U.S.A., Akzo Nobel of Chicago, Ill., USA; Stroever Shellac Bremen of Bremen, Germany; Dow Chemical Company of Midland, Mich., USA; Bayer AG of Leverkusen, Germany; Sigma-Aldrich Corp., St. Louis, Mo., USA.

Perfumes—

In one aspect the composition comprises a perfume that comprises one or more perfume raw materials selected from the group consisting of 1,1'-oxybis-2-propanol; 1,4-cyclohexanedicarboxylic acid, diethyl ester; (ethoxymethoxy)cyclododecane; 1,3-nonanediol, monoacetate; (3-methylbutoxy)acetic acid, 2-propenyl ester; beta-methyl cyclododecaneethanol; 2-methyl-3-[(1,7,7-trimethylbicyclo[2.2.1]hept-2-yl)oxy]-1-propanol; oxacyclohexadecan-2-one; alpha-methyl-benzenemethanol acetate; trans-3-ethoxy-1,1,5-trimethylcyclohexane; 4-(1,1-dimethylethyl)cyclohexanol acetate; dodecahydro-3a,6,6,9a-tetramethylnaphtho[2,1-b]furan; beta-methyl benzenepropanal; beta-methyl-3-(1-methylethyl)benzenepropanal; 4-phenyl-2-butanone; 2-methylbutanoic acid, ethyl ester; benzaldehyde; 2-methylbutanoic acid, 1-methylethyl ester; dihydro-5-pentyl-2(3H)furanone; (2E)-1(2,6,6-trimethyl-2-cyclohexen-1-yl)-2-buten-1-one; dodecanal; undecanal; decanal; 2-(phenylmethylene)octanal; 2-[[3-[4-(1,1-dimethylethyl)phenyl]-2-methylpropylidene]amino] benzoic acid, methyl ester; 1-(2,6,6-trimethyl-3-cyclohexen-1-yl)-2-buten-1-one; 2-pentylcyclopentanone; 3-oxo-2-pentyl cyclopentaneacetic acid, methyl ester; 4-hydroxy-3-methoxybenzaldehyde; 3-ethoxy-4-hydroxybenzaldehyde; 2-heptylcyclopentanone; 1-(4-methylphenyl)ethanone; (3E)-4-(2,6,6-trimethyl-1-cyclohexen-1-yl)-3-buten-2-one; (3E)-4-(2,6,6-trimethyl-2-cyclohexen-1-yl)-3-buten-2-one; benzeneethanol; 2H-1-benzopyran-2-one; 4-methoxybenzaldehyde; 10-undecenal; propanoic acid, phenylmethyl ester; beta-methylbenzenepentanol; 1,1-diethoxy-3,7-dimethyl-2,6-octadiene; (2E)-1-(2,6,6-trimethyl-1-cyclohexen-1-yl)-2-buten-1-one; acetic acid, phenylmethyl ester; cyclohexanepropanoic acid, 2-propenyl ester; hexanoic acid, 2-propenyl ester; 1,2-dimethoxy-4-(2-propenyl)benzene; 1,5-dimethyl-bicyclo[3.2.1]octan-8-one oxime; 4-(4-hydroxy-4-methylpentyl)-3-cyclohexene-1-carboxaldehyde; 3-buten-2-ol; 2-[[[2,4(or 3,5)-dimethyl-3-cyclohexen-1-yl]methylene]amino]benzoic acid, methyl ester; 8-cyclohexadecen-1-one; methyl ionone; 2,6-dimethyl-7-octen-2-ol; 2-methoxy-4-(2-propenyl)phenol; (2E)-3,7-dimethyl-2,6-Octadien-1-ol; 2-hydroxy-Benzoic acid, (3Z)-3-hexenyl ester; 2-tridecenenitrile; 4-(2,2-dimethyl-6-methylenecyclohexyl)-3-methyl-3-buten-2-one; tetrahydro-4-methyl-2-(2-methyl-1-propenyl)-2H-pyran; Acetic acid, (2-methylbutoxy)-, 2-propenyl ester; Benzoic acid, 2-hydroxy-, 3-methylbutyl ester; 2-Buten-1-one, 1-(2,6,6-trimethyl-1-cyclohexen-1-yl)-, (Z)—; Cyclopentanecarboxylic acid, 2-hexyl-3-oxo-, methyl ester; Benzenepropanal, 4-ethyl-.alpha.,.alpha.-dimethyl-; 3-Cyclohexene-1-carboxaldehyde, 3-(4-hydroxy-4-methylpentyl)-; Ethanone, 1-(2,3,4,7,8,8a-hexahydro-3,6,8,8-tetramethyl-1H-3a,7-methanoazulen-5-yl)-, [3R-(3.alpha.,3a.beta.,7.beta.,8a.alpha.)]-; Undecanal, 2-methyl-2H-Pyran-2-one, 6-butyltetrahydro-; Benzenepropanal, 4-(1,1-dimethylethyl)-.alpha.-methyl-; 2(3H)-Furanone, 5-heptyldihydro-; Benzoic acid, 2-[(7-hydroxy-3,7-dimethyloctylidene)amino]-, methyl; Benzoic acid, 2-hydroxy-, phenylmethyl ester; Naphthalene, 2-methoxy-; 2-Cyclopenten-1-one, 2-hexyl-; 2(3H)-Furanone, 5-hexyldihydro-; Oxiranecarboxylic acid, 3-methyl-3-phenyl-, ethyl ester; 2-Oxabicyclo[2.2.2]octane, 1,3,3-trimethyl-; Benzenepentanol, .gamma.-methyl-; 3-Octanol, 3,7-dimethyl-; 3,7-dimethyl-2,6-octadienenitrile; 3,7-dimethyl-6-octen-1-ol; Terpineol acetate; 2-methyl-6-methylene-7-Octen-2-ol, dihydro derivative; 3a,4,5,6,7,7a-hexahydro-4,7-Methano- 1H-inden-6-ol propanoate; 3-methyl-2-buten-1-ol acetate; (Z)-3-Hexen-1-ol acetate; 2-ethyl-4-(2,2,3-trimethyl-3-cyclopenten-1-yl)-2-buten-1-ol; 4-(octahydro-4,7-methano-5H-inden-5-ylidene)-butanal; 3-2,4-dimethyl-cyclohexene-1-carboxaldehyde; 1-(1,2,3,4,5,6,7,8-octahydro-2,3,8,8-tetramethyl-2-naphthalenyl)-ethanone; 2-hydroxy-benzoic acid, methyl ester; 2-hydroxy-benzoic acid, hexyl ester; 2-phenoxy-ethanol; 2-hydroxy-benzoic acid, pentyl ester; 2,3-heptanedione; 2-hexen-1-ol; 6-Octen-2-ol, 2,6-dimethyl-; damascone (alpha, beta, gamma or delta or mixtures thereof), 4,7-Methano-1H-inden-6-ol, 3a,4,5,6,7,7a-hexahydro-, acetate; 9-Undecenal; 8-Undecenal; Isocyclocitral; Ethanone, 1-(1,2,3,5,6,7,8,8a-octahydro-2,3,8,8-tetramethyl-2-naphthalenyl)-; 3-Cyclohexene-1-carboxaldehyde, 3,5-dimethyl-; 3-Cyclohexene-1-carboxaldehyde, 2,4-dimethyl-; 1,6-Octadien-3-ol, 3,7-dimethyl-; 1,6-Octadien-3-ol, 3,7-dimethyl-, acetate; Lilial (p-t-Bucinal), and Cyclopentanone, 2-[2-(4-methyl-3-cyclohexen-1-yl)propyl]- and 1-methyl-4-(1-methylethenyl)cyclohexene and mixtures thereof.

In one aspect the composition may comprise an encapsulated perfume particle comprising either a water-soluble hydroxylic compound of melamine-formaldehyde or modified polyvinyl alcohol. In one aspect the encapsulate comprises (a) an at least partially water-soluble solid matrix comprising one or more water-soluble hydroxylic compounds, preferably starch; and (b) a perfume oil encapsulated by the solid matrix.

In a further aspect the perfume may be pre-complexed with a polyamine, preferably a polyethylenimine so as to form a Schiff base.

Water-Soluble Film—

The compositions of the present invention may also be encapsulated within a water-soluble film. Preferred film materials are preferably polymeric materials. The film material can, for example, be obtained by casting, blow-moulding, extrusion or blown extrusion of the polymeric material, as known in the art.

Hygiene and Malodour—

The compositions of the present invention may also comprise one or more of zinc ricinoleate, thymol, quaternary ammonium salts such as Bardac®, polyethylenimines (such as Lupasol® from BASF) and zinc complexes thereof, silver and silver compounds, especially those designed to slowly release $Ag^+$ or nano-silver dispersions.

Probiotics—

The compositions may comprise probiotics.

Fabric Softening Agent:

The composition may alternatively be a rinse added fabric softening/treatment agent.

1. Preferred Fabric Softening Active Compounds

A first preferred type of fabric softening active comprises, as the principal active, compounds of the formula $$\{R_{4-m}-N^+-[(CH_2)_n-Y-R^1]_m\}X^- \quad (1)$$

wherein each R substituent is either hydrogen, a short chain $C_1$-$C_6$, preferably $C_1$-$C_3$ alkyl or hydroxyalkyl group, e.g., methyl, ethyl, propyl, hydroxyethyl, and the like, poly ($C_{2-3}$ alkoxy), preferably polyethoxy, benzyl, or mixtures thereof; each m is 2 or 3; each n is from 1 to about 4, preferably 2; each Y is —O—(O)C—, —C(O)—O—, —NR—C(O)—, or —C(O)—NR—; the sum of carbons in each $R^1$, plus one when Y is —O—(O)C— or —NR—C(O)—, is $C_{12}$-$C_{22}$, preferably $C_{14}$-$C_{20}$, with each $R^1$ being a hydrocarbyl, or substituted hydrocarbyl group, and $X^-$ can be any softener-compatible anion, preferably, chloride, bromide, methylsulfate, ethylsulfate, sulfate, and nitrate, more preferably chloride or methyl sulfate;

A second type of preferred fabric softening active has the general formula:

$$[R_3N^+CH_2CH(YR^1)(CH_2YR^1)]X^-$$

wherein each Y, R, $R^1$, and $X^-$ have the same meanings as before. Such compounds include those having the formula:

$$[CH_3]_3N^{(+)}[CH_2CH(CH_2O(O)CR^1)O(O)CR^1]Cl^{(-)} \quad (2)$$

wherein each R is a methyl or ethyl group and preferably each $R^1$ is in the range of $C_{15}$ to $C_{19}$. As used herein, when the diester is specified, it can include the monoester that is present.

An example of a preferred DEQA (2) is the "propyl" ester quaternary ammonium fabric softener active having the formula 1,2-di(acyloxy)-3-trimethylammoniopropane chloride.

A third type of preferred fabric softening active has the formula:

$$[R_{4-m}-N^+-R^1_m]X^- \quad (3)$$

wherein each R, $R^1$, and $X^-$ have the same meanings as before.

A fourth type of preferred fabric softening active has the formula:

$$\left[\begin{array}{c} R^1-C \overset{N-CH_2}{\underset{O}{\diagup}} \\ \parallel \quad \quad N^+-CH_2 \\ R^1-C-G-R^2 \quad R \end{array}\right] A^- \quad (4)$$

wherein each R, $R^1$, and $A^-$ have the definitions given above; each $R^2$ is a $C_{1-6}$ alkylene group, preferably an ethylene group; and G is an oxygen atom or an —NR— group;

A fifth type of preferred fabric softening active has the formula:

$$R^1-C \overset{N-CH_2}{\underset{O}{\diagup}} \\ \parallel \quad \quad N-CH_2 \\ R^1-C-G-R^2 \quad (5)$$

wherein $R^1$, $R^2$ and G are defined as above.

A sixth type of preferred fabric softening active are condensation reaction products of fatty acids with dialkylenetriamines in, e.g., a molecular ratio of about 2:1, said reaction products containing compounds of the formula:

$$R^1-C(O)-NH-R^2-NH-R^3-NH-C(O)-R^1 \quad (6)$$

wherein $R^1$, $R^2$ are defined as above, and each $R^3$ is a $C_{1-6}$ alkylene group, preferably an ethylene group and wherein the reaction products may optionally be quaternized by the additional of an alkylating agent such as dimethyl sulfate.

A seventh type of preferred fabric softening active has the formula:

$$[R^1-C(O)-NR-R^2-N(R)_2-R^3-NR-C(O)-R^1]^+A^- \quad (7)$$

wherein R, $R^1$, $R^2$, $R^3$ and $A^-$ are defined as above;

An eighth type of preferred fabric softening active are reaction products of fatty acid with hydroxyalkylalkylenediamines in a molecular ratio of about 2:1, said reaction products containing compounds of the formula:

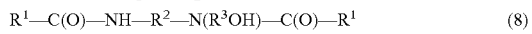

wherein $R^1$, $R^2$ and $R^3$ are defined as above;

A ninth type of preferred fabric softening active has the formula:

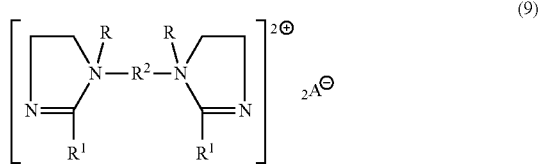

wherein R, $R^1$, $R^2$, and $A^-$ are defined as above.

Non-limiting examples of compound (1) are N,N-bis(stearoyl-oxy-ethyl) N,N-dimethyl ammonium chloride, N,N-bis(tallowoyl-oxy-ethyl) N,N-dimethyl ammonium chloride, N,N-bis(stearoyl-oxy-ethyl)N-(2 hydroxyethyl)N-methyl ammonium methylsulfate.

Non-limiting examples of compound (2) is 1,2 di(stearoyl-oxy) 3 trimethyl ammoniumpropane chloride.

Non-limiting examples of Compound (3) are dialkylenedimethylammonium salts such as dicanoladimethylammonium chloride, di(hard)tallowdimethylammonium chloride dicanoladimethylammonium methylsulfate. An example of commercially available dialkylenedimethylammonium salts usable in the present invention is dioleyldimethylammonium chloride available from Witco Corporation under the trade name Adogen® 472 and dihardtallow dimethylammonium chloride available from Akzo Nobel Arquad 2HT75.

A non-limiting example of Compound (4) is 1-methyl-1-stearoylamidoethyl-2-stearoylimidazolinium methylsulfate wherein $R^1$ is an acyclic aliphatic $C_{15}$-$C_{17}$ hydrocarbon group, $R^2$ is an ethylene group, G is a NH group, $R^5$ is a methyl group and $A^-$ is a methyl sulfate anion, available commercially from the Witco Corporation under the trade name Varisoft®.

A non-limiting example of Compound (5) is 1-tallowylamidoethyl-2-tallowylimidazoline wherein $R^1$ is an acyclic aliphatic $C_{15}$-$C_{17}$ hydrocarbon group, $R^2$ is an ethylene group, and G is a NH group.

A non-limiting example of Compound (6) is the reaction products of fatty acids with diethylenetriamine in a molecular ratio of about 2:1, said reaction product mixture containing N,N"-dialkyldiethylenetriamine with the formula:

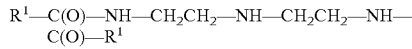

wherein $R^1$—C(O) is an alkyl group of a commercially available fatty acid derived from a vegetable or animal source, such as Emersol® 223LL or Emersol® 7021, available from Henkel Corporation, and $R^2$ and $R^3$ are divalent ethylene groups.

A non-limiting example of Compound (7) is a difatty amidoamine based softener having the formula:

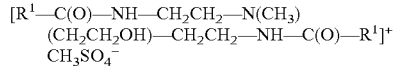

wherein $R^1$—C(O) is an alkyl group, available commercially from the Witco Corporation e.g. under the trade name Varisoft® 222LT.

An example of Compound (8) is the reaction products of fatty acids with N-2-hydroxyethylethylenediamine in a molecular ratio of about 2:1, said reaction product mixture containing a compound of the formula:

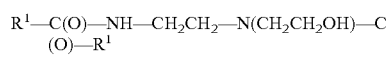

wherein $R^1$—C(O) is an alkyl group of a commercially available fatty acid derived from a vegetable or animal source, such as Emersol® 223LL or Emersol® 7021, available from Henkel Corporation.

An example of Compound (9) is the diquaternary compound having the formula:

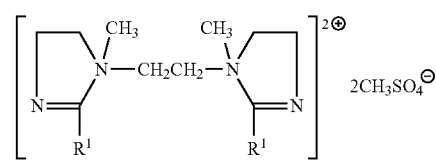

wherein $R^1$ is derived from fatty acid, and the compound is available from Witco Company.

It will be understood that combinations of softener actives disclosed above are suitable for use in this invention.

Anion A

In the cationic nitrogenous salts herein, the anion $A^-$, which is any softener compatible anion, provides electrical neutrality. Most often, the anion used to provide electrical neutrality in these salts is from a strong acid, especially a halide, such as chloride, bromide, or iodide. However, other anions can be used, such as methylsulfate, ethylsulfate, acetate, formate, sulfate, carbonate, and the like. Chloride and methylsulfate are preferred herein as anion A. The anion can also, but less preferably, carry a double charge in which case $A^-$ represents half a group.

Silicones—

Additional silicones may be used. Suitable silicones comprise Si—O moieties and may be selected from (a) non-functionalized siloxane polymers, (b) functionalized siloxane polymers, and combinations thereof. The molecular weight of the organosilicone is usually indicated by the reference to the viscosity of the material. In one aspect, the organosilicones may comprise a viscosity of from about 10 to about 2,000,000 centistokes at 25° C. In another aspect, suitable organosilicones may have a viscosity of from about 10 to about 800,000 centistokes at 25° C.

Suitable organosilicones may be linear, branched or cross-linked. In one aspect, the organosilicones may comprise of silicone resins. Silicone resins are highly cross-linked polymeric siloxane systems. The cross-linking is introduced through the incorporation of trifunctional and tetrafunctional silanes with monofunctional or difunctional, or both, silanes during manufacture of the silicone resin. As used herein, the nomenclature SiO"n"/2 represents the ratio of oxygen and silicon atoms. For example, $SiO_{1/2}$ means that one oxygen is shared between two Si atoms. Likewise $SiO_{2/2}$ means that two oxygen atoms are shared between two Si atoms and $SiO_{3/2}$ means that three oxygen atoms are shared are shared between two Si atoms.

Silicone materials and silicone resins in particular, can conveniently be identified according to a shorthand nomenclature system known to those of ordinary skill in the art as "MDTQ" nomenclature. Under this system, the silicone is described according to presence of various siloxane monomer units which make up the silicone. Briefly, the symbol M denotes the monofunctional unit $(CH_3)_3SiO_{0.5}$; D denotes the difunctional unit $(CH_3)_2SiO$; T denotes the trifunctional unit $(CH_3)SiO_{1.5}$; and Q denotes the quadra- or tetra-functional unit $SiO_2$. Primes of the unit symbols (e.g. M', D', T', and Q') denote substituents other than methyl, and must be specifically defined for each occurrence.

Other modified silicones or silicone copolymers are also useful herein. Examples of these include silicone-based quaternary ammonium compounds (Kennan quats); end-terminal quaternary siloxanes; silicone aminopolyalkylene-oxide block copolymers; hydrophilic silicone emulsions; and polymers made up of one or more crosslinked rake or comb silicone copolymer segments.

In one aspect, the organosilicone may comprise a non-functionalized siloxane polymer that may have Formula (XXIV) below, and may comprise polyalkyl and/or phenyl silicone fluids, resins and/or gums.

$$[R_1R_2R_3SiO_{1/2}]_n[R_4R_4SiO_{2/2}]_m[R_4SiO_{3/2}]_j \quad \text{Formula (XXIV)}$$

wherein:
i) each $R_1$, $R_2$, $R_3$ and $R_4$ may be independently selected from the group consisting of H, —OH, $C_1$-$C_{20}$ alkyl, $C_1$-$C_{20}$ substituted alkyl, $C_6$-$C_{20}$ aryl, $C_6$-$C_{20}$ substituted aryl, alkylaryl, and/or $C_1$-$C_{20}$ alkoxy, moieties;
ii) n may be an integer from about 2 to about 10, or from about 2 to about 6; or 2; such that n=j+2;
iii) m may be an integer from about 5 to about 8,000, from about 7 to about 8,000 or from about 15 to about 4,000;
iv) j may be an integer from 0 to about 10, or from 0 to about 4, or 0;

In one aspect, $R_2$, $R_3$ and $R_4$ may comprise methyl, ethyl, propyl, $C_4$-$C_{20}$ alkyl, and/or $C_6$-$C_{20}$ aryl moieties. In one aspect, each of $R_2$, $R_3$ and $R_4$ may be methyl. Each $R_1$ moiety blocking the ends of the silicone chain may comprise a moiety selected from the group consisting of hydrogen, methyl, methoxy, ethoxy, hydroxy, propoxy, and/or aryloxy.

In one aspect, the organosilicone may be polydimethylsiloxane, dimethicone, dimethiconol, dimethicone crosspolymer, phenyl trimethicone, alkyl dimethicone, lauryl dimethicone, stearyl dimethicone and phenyl dimethicone. Examples include those available under the names DC 200 Fluid, DC 1664, DC 349, DC 346G available from Dow Corning® Corporation, Midland, Mich., and those available under the trade names SF1202, SF1204, SF96, and Viscasil® available from Momentive Silicones, Waterford, N.Y.

In one aspect, the organo silicone may comprise a cyclic silicone. The cyclic silicone may comprise a cyclomethicone of the formula $[(CH_3)_2SiO]_n$ where n is an integer that may range from about 3 to about 7, or from about 5 to about 6.

In one aspect, the organosilicone may comprise a functionalized siloxane polymer. Functionalized siloxane polymers may comprise one or more functional moieties selected from the group consisting of amino, amido, alkoxy, hydroxy, polyether, carboxy, hydride, mercapto, sulfate phosphate, and/or quaternary ammonium moieties. These moieties may be attached directly to the siloxane backbone through a bivalent alkylene radical, (i.e., "pendant") or may be part of the backbone. Suitable functionalized siloxane polymers include materials selected from the group consisting of aminosilicones, amidosilicones, silicone polyethers, silicone-urethane polymers, quaternary ABn silicones, amino ABn silicones, and combinations thereof.

In one aspect, the functionalized siloxane polymer may comprise a silicone polyether, also referred to as "dimethicone copolyol." In general, silicone polyethers comprise a polydimethylsiloxane backbone with one or more polyoxyalkylene chains. The polyoxyalkylene moieties may be incorporated in the polymer as pendent chains or as terminal blocks. Exemplary commercially available silicone polyethers include DC 190, DC 193, FF400, all available from Dow Corning® Corporation, and various Silwet® surfactants available from Momentive Silicones.

In another aspect, the functionalized siloxane polymer may comprise an aminosilicone. In another aspect, the aminosilicone may comprise the structure of Formula (XXV):

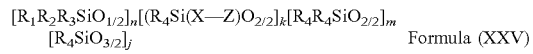

$$[R_1R_2R_3SiO_{1/2}]_n[(R_4Si(X\text{—}Z)O_{2/2}]_k[R_4R_4SiO_{2/2}]_m[R_4SiO_{3/2}]_j \quad \text{Formula (XXV)}$$

wherein
i. $R_1$, $R_2$, $R_3$ and $R_4$ may each be independently selected from H, OH, $C_1$-$C_{20}$ alkyl, $C_1$-$C_{20}$ substituted alkyl, $C_6$-$C_{20}$ aryl, $C_6$-$C_{20}$ substituted aryl, alkylaryl, and/or $C_1$-$C_{20}$ alkoxy;
ii. Each X may be independently selected from a divalent alkylene radical comprising 2-12 carbon atoms, —$(CH_2)_s$- wherein s may be an integer from about 2 to about 10; —$CH_2$—$CH(OH)$—$CH_2$—; and/or

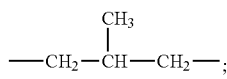

iii. Each Z may be independently selected from —$N(R_5)_2$;

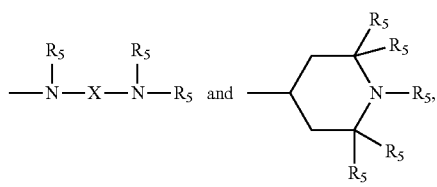

wherein each $R_5$ may be selected independently selected from H, $C_1$-$C_{20}$ alkyl; and $A^-$ may be a compatible anion. In one aspect, $A^-$ may be a halide;
iv. k may be an integer from about 3 to about 20, from about 5 to about 18 more or even from about 5 to about 10;
v. m may be an integer from about 100 to about 2,000, or from about 150 to about 1,000;
vi. n may be an integer from about 2 to about 10, or about 2 to about 6, or 2, such that n=j+2; and
vii. j may be an integer from 0 to about 10, or from 0 to about 4, or 0;

In one aspect, $R_1$ may comprise —OH. In this aspect, the organosilicone is amidomethicone. Exemplary commercially available aminosilicones include DC 8822, 2-8177, and DC-949, available from Dow Corning® Corporation, and KF-873, available from Shin-Etsu Silicones, Akron, Ohio.

In one aspect the silicone may be chosen from a random or blocky organosilicone polymer having the following formula:

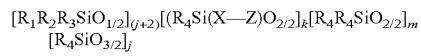

$$[R_1R_2R_3SiO_{1/2}]_{(j+2)}[(R_4Si(X\text{—}Z)O_{2/2}]_k[R_4R_4SiO_{2/2}]_m[R_4SiO_{3/2}]_j$$

wherein:
j is an integer from 0 to about 98; in one aspect j is an integer from 0 to about 48; in one aspect, j is 0;
k is an integer from 0 to about 200, in one aspect k is an integer from 0 to about 50; when k=0, at least one of $R_1$, $R_2$ or $R_3$ is —X—Z;

m is an integer from 4 to about 5,000; in one aspect m is an integer from about 10 to about 4,000; in another aspect m is an integer from about 50 to about 2,000;

$R_1$, $R_2$ and $R_3$ are each independently selected from the group consisting of H, OH, $C_1$-$C_{32}$ alkyl, $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl, $C_6$-$C_{32}$ substituted alkylaryl, $C_1$-$C_{32}$ alkoxy, $C_1$-$C_{32}$ substituted alkoxy and X—Z;

each $R_4$ is independently selected from the group consisting of H, OH, $C_1$-$C_{32}$ alkyl, $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl, $C_6$-$C_{32}$ substituted alkylaryl, $C_1$-$C_{32}$ alkoxy and $C_1$-$C_{32}$ substituted alkoxy;

each X in said alkyl siloxane polymer comprises a substituted or unsubstituted divalent alkylene radical comprising 2-12 carbon atoms, in one aspect each divalent alkylene radical is independently selected from the group consisting of —(CH$_2$)s- wherein s is an integer from about 2 to about 8, from about 2 to about 4; in one aspect, each X in said alkyl siloxane polymer comprises a substituted divalent alkylene radical selected from the group consisting of: —CH$_2$—CH(OH)—CH$_2$—; —CH$_2$—CH$_2$—CH(OH)—; and

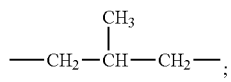

each Z is selected independently from the group consisting of

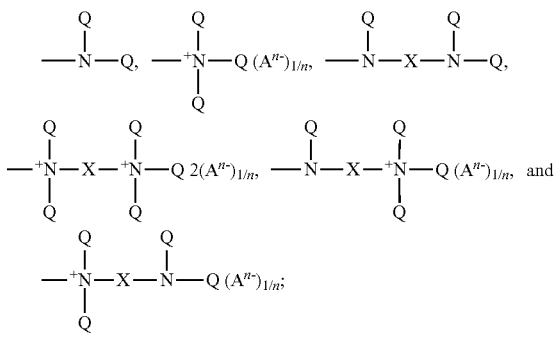

with the proviso that when Z is a quat, Q cannot be an amide, imine, or urea moiety;

for Z $A^{n-}$ is a suitable charge balancing anion. In one aspect $A^{n-}$ is selected from the group consisting of Cl$^-$, Br$^-$, I$^-$, methylsulfate, toluene sulfonate, carboxylate and phosphate; and at least one Q in said organosilicone is independently selected from —CH$_2$—CH(OH)—CH$_2$—R$_5$;

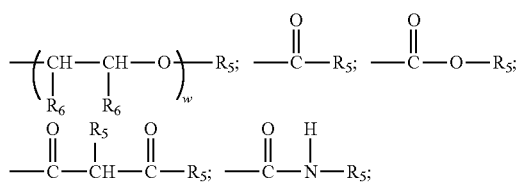

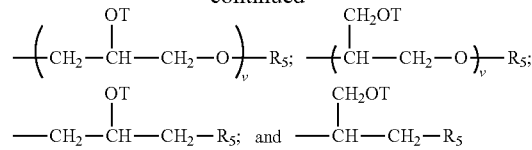

each additional Q in said organosilicone is independently selected from the group comprising of H, $C_1$-$C_{32}$ alkyl, $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl, $C_6$-$C_{32}$ substituted alkylaryl, —CH$_2$—CH(OH)—CH$_2$—R$_5$;

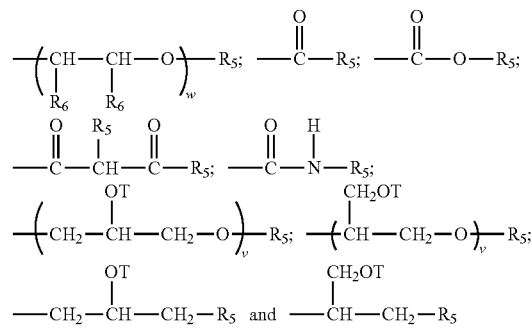

wherein each $R_5$ is independently selected from the group consisting of H, $C_1$-$C_{32}$ alkyl, $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl, $C_6$-$C_{32}$ substituted alkylaryl, —(CHR$_6$—CHR$_6$—O—)$_w$-L and a siloxyl residue;

each $R_6$ is independently selected from H, $C_1$-$C_{18}$ alkyl each L is independently selected from —C(O)—R$_7$ or $R_7$;

w is an integer from 0 to about 500, in one aspect w is an integer from about 1 to about 200; in one aspect w is an integer from about 1 to about 50;

each $R_7$ is selected independently from the group consisting of H; $C_1$-$C_{32}$ alkyl; $C_1$-$C_{32}$ substituted alkyl, $C_5$-$C_{32}$ or $C_6$-$C_{32}$ aryl, $C_5$-$C_{32}$ or $C_6$-$C_{32}$ substituted aryl, $C_6$-$C_{32}$ alkylaryl; $C_6$-$C_{32}$ substituted alkylaryl and a siloxyl residue;

each T is independently selected from H, and

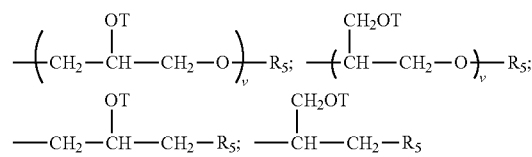

and wherein each v in said organosilicone is an integer from 1 to about 10, in one aspect, v is an integer from 1 to about 5 and the sum of all v indices in each Q in the said organosilicone is an integer from 1 to about 30 or from 1 to about 20 or even from 1 to about 10.

In one aspect, the organosilicone may comprise amine ABn silicones and quat ABn silicones. Such organosilicones are generally produced by reacting a diamine with an epoxide. These are commercially available under the trade names Magnasoft® Prime, Magnasoft® JSS, Silsoft® A-858 (all from Momentive Silicones).

Deposition Aid—In one aspect, the fabric treatment composition may comprise from about 0.01% to about 10%, from about 0.05 to about 5%, or from about 0.15 to about 3% of a deposition aid.

In one aspect, the deposition aid may be a cationic or amphoteric polymer. In one aspect, the deposition aid may be a cationic polymer. Cationic polymers in general and their method of manufacture are known in the literature. In one aspect, the cationic polymer may have a cationic charge density of from about 0.005 to about 23, from about 0.01 to about 12, or from about 0.1 to about 7 milliequivalents/g, at the pH of intended use of the composition. For amine-containing polymers, wherein the charge density depends on the pH of the composition, charge density is measured at the intended use pH of the product. Such pH will generally range from about 2 to about 11, more generally from about 2.5 to about 9.5. Charge density is calculated by dividing the number of net charges per repeating unit by the molecular weight of the repeating unit. The positive charges may be located on the backbone of the polymers and/or the side chains of polymers.

One group of suitable cationic polymers includes those produced by polymerization of ethylenically unsaturated monomers using a suitable initiator or catalyst. Suitable polymers may be selected from the group consisting of cationic or amphoteric polysaccharide, polyethylene imine and its derivatives, and a synthetic polymer made by polymerizing one or more cationic monomers selected from the group consisting of N,N-dialkylaminoalkyl acrylate, N,N-dialkylaminoalkyl methacrylate, N,N-dialkylaminoalkyl acrylamide, N,N-dialkylaminoalkylmethacrylamide, quaternized N, N dialkylaminoalkyl acrylate quaternized N,N-dialkylaminoalkyl methacrylate, quaternized N,N-dialkylaminoalkyl acrylamide, quaternized N,N-dialkylaminoalkylmethacrylamide, Methacryloamidopropyl-pentamethyl-1,3-propylene-2-ol-ammonium dichloride, N,N,N,N',N',N'',N''-heptamethyl-N'''-3-(1-oxo-2-methyl-2-propenyl)aminopropyl-9-oxo-8-azo-decane-1,4,10-triammonium trichloride, vinylamine and its derivatives, allylamine and its derivatives, vinyl imidazole, quaternized vinyl imidazole and diallyl dialkyl ammonium chloride and combinations thereof, and optionally a second monomer selected from the group consisting of acrylamide, N,N-dialkyl acrylamide, methacrylamide, N,N-dialkylmethacrylamide, $C_1$-$C_{12}$ alkyl acrylate, $C_1$-$C_{12}$ hydroxyalkyl acrylate, polyalkylene glycol acrylate, $C_1$-$C_{12}$ alkyl methacrylate, $C_1$-$C_{12}$ hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole, vinyl caprolactam, and derivatives, acrylic acid, methacrylic acid, maleic acid, vinyl sulfonic acid, styrene sulfonic acid, acrylamidopropylmethane sulfonic acid (AMPS) and their salts. The polymer may optionally be branched or cross-linked by using branching and crosslinking monomers. Branching and crosslinking monomers include ethylene glycoldiacrylate divinylbenzene, and butadiene. A suitable polyethyleneinine useful herein is that sold under the tradename Lupasol® by BASF, AG, Lugwigschaefen, Germany.

In another aspect, the treatment composition may comprise an amphoteric deposition aid polymer so long as the polymer possesses a net positive charge. Said polymer may have a cationic charge density of about 0.05 to about 18 milliequivalents/g.

In another aspect, the deposition aid may be selected from the group consisting of cationic polysaccharide, polyethylene imine and its derivatives, poly(acrylamide-co-diallyldimethylammonium chloride), poly(acrylamide-methacrylamidopropyltrimethyl ammonium chloride), poly(acrylamide-co-N,N-dimethyl aminoethyl acrylate) and its quaternized derivatives, poly(acrylamide-co-N,N-dimethyl aminoethyl methacrylate) and its quaternized derivative, poly(hydroxyethylacrylate-co-dimethyl aminoethyl methacrylate), poly(hydroxpropylacrylate-co-dimethyl aminoethyl methacrylate), poly(hydroxpropylacrylate-co-methacrylamidopropyltrimethylammonium chloride), poly(acrylamide-co-diallyldimethylammonium chloride-co-acrylic acid), poly(acrylamide-methacrylamidopropyltrimethyl ammonium chloride-co-acrylic acid), poly(diallyldimethyl ammonium chloride), poly(vinylpyrrolidone-co-dimethylaminoethyl methacrylate), poly(ethyl methacrylate-co-quaternized dimethylaminoethyl methacrylate), poly(ethyl methacrylate-co-oleyl methacrylate-co-diethylaminoethyl methacrylate), poly(diallyldimethylammonium chloride-co-acrylic acid), poly(vinyl pyrrolidone-co-quaternized vinyl imidazole) and poly(acrylamide-co-Methacryloamidopropyl-pentamethyl-1,3-propylene-2-ol-ammonium dichloride), Suitable deposition aids include Polyquaternium-1, Polyquaternium-5, Polyquaternium-6, Polyquaternium-7, Polyquaternium-8, Polyquaternium-11, Polyquaternium-14, Polyquaternium-22, Polyquaternium-28, Polyquaternium-30, Polyquaternium-32 and Polyquaternium-33, as named under the International Nomenclature for Cosmetic Ingredients.

In one aspect, the deposition aid may comprise polyethyleneimine or a polyethyleneimine derivative. In another aspect, the deposition aid may comprise a cationic acrylic based polymer. In a further aspect, the deposition aid may comprise a cationic polyacrylamide. In another aspect, the deposition aid may comprise a polymer comprising polyacrylamide and polymethacrylamidoproply trimethylammonium cation. In another aspect, the deposition aid may comprise poly(acrylamide-N-dimethyl aminoethyl acrylate) and its quaternized derivatives. In this aspect, the deposition aid may be that sold under the tradename Sedipur®, available from BTC Specialty Chemicals, a BASF Group, Florham Park, N.J. In a yet further aspect, the deposition aid may comprise poly(acrylamide-co-methacrylamidopropyltrimethyl ammonium chloride). In another aspect, the deposition aid may comprise a non-acrylamide based polymer, such as that sold under the tradename Rheovis® CDE, available from Ciba Specialty Chemicals, a BASF group, Florham Park, N.J.

In another aspect, the deposition aid may be selected from the group consisting of cationic or amphoteric polysaccharides. In one aspect, the deposition aid may be selected from the group consisting of cationic and amphoteric cellulose ethers, cationic or amphoteric galactomanan, cationic guar gum, cationic or amphoteric starch, and combinations thereof Another group of suitable cationic polymers may include alkylamine-epichlorohydrin polymers which are reaction products of amines and oligoamines with epicholorohydrin. Examples include dimethylamine-epichlorohydrin-ethylenediamine, available under the trade name Cartafix® CB and Cartafix® TSF from Clariant, Basle, Switzerland.

Another group of suitable synthetic cationic polymers may include polyamidoamine-epichlorohydrin (PAE) resins of polyalkylenepolyamine with polycarboxylic acid. The most common PAE resins are the condensation products of diethylenetriamine with adipic acid followed by a subsequent reaction with epichlorohydrin. They are available from Hercules Inc. of Wilmington Del. under the trade name Kymene™ or from BASF AG (Ludwigshafen, Germany) under the trade name Luresin™.

The cationic polymers may contain charge neutralizing anions such that the overall polymer is neutral under ambient conditions. Non-limiting examples of suitable counter ions (in addition to anionic species generated during use) include chloride, bromide, sulfate, methylsulfate, sulfonate, methylsulfonate, carbonate, bicarbonate, formate, acetate, citrate, nitrate, and mixtures thereof.

The weight-average molecular weight of the polymer may be from about 500 to about 5,000,000, or from about 1,000 to about 2,000,000, or from about 2,500 to about 1,500,000 Daltons, as determined by size exclusion chromatography relative to polyethyleneoxide standards with RI detection. In one aspect, the MW of the cationic polymer may be from about 500 to about 37,500 Daltons.

Miscellaneous Adjunct Ingredients

A wide variety of other ingredients may be used in the cleaning compositions herein, including other active ingredients, carriers, hydrotropes, processing aids, dyes or pigments, solvents for liquid formulations, and solid or other liquid fillers, erythrosine, colliodal silica, waxes, probiotics, surfactin, aminocellulosic polymers, Zinc Ricinoleate, perfume microcapsules, rhamnolipids, sophorolipids, glycopeptides, methyl ester sulfonates, methyl ester ethoxylates, sulfonated estolides, cleavable surfactants, biopolymers, silicones, modified silicones, aminosilicones, deposition aids, locust bean gum, cationic hydroxyethylcellulose polymers, cationic guars, hydrotropes (especially cumenesulfonate salts, toluenesulfonate salts, xylenesulfonate salts, and naphalene salts), antioxidants, BHT, PVA particle-encapsulated dyes or perfumes, pearlescent agents, effervescent agents, color change systems, silicone polyurethanes, opacifiers, tablet disintegrants, biomass fillers, fast-dry silicones, glycol distearate, hydroxyethylcellulose polymers, hydrophobically modified cellulose polymers or hydroxyethylcellulose polymers, starch perfume encapsulates, emulsified oils, bisphenol antioxidants, microfibrous cellulose structurants, properfumes, styrene/acrylate polymers, triazines, soaps, superoxide dismutase, benzophenone protease inhibitors, functionalized TiO2, dibutyl phosphate, silica perfume capsules, and other adjunct ingredients,

TEST METHODS

Test Methods:
Method for Determining the Recovery Index for Organo Siloxane Polymer.

The Recovery Index is measured using a Tensile and Compression Tester Instrument, such as the Instron Model 5565 (Instron Corp., Norwood, Mass., U.S.A.). The instrument is configured by selecting the following settings: the mode is Tensile Extension; the Waveform Shape is Triangle; the Maximum Strain is 10%, the Rate is 0.83 mm/sec, the number of Cycles is 4; and the Hold time is 15 seconds between cycles.

1) Determine the weight of one approximately 25.4 cm square swatch of 100% cotton woven fabric, (a suitable fabric is the Mercerized Combed Cotton Warp Sateen, Product Code 479, available from Testfabrics Inc., West Pittston, Pa., USA).
2) Determine the amount of organo siloxane polymer required to deposit 5 mg of the polymer per gram of fabric swatch and weigh that amount into a 50 ml plastic centrifuge tube with a lid.
3) Dilute the organo siloxane polymer to 1.3 times the weight of the swatch with a solvent that completely dissolves or disperses the organo siloxane polymer (examples: isopropyl alcohol, THF, N,N-dimethylacetamide, water).
4) Thoroughly disperse or dissolve silicone polyurethaneurea with shaking or vortex stirring as needed.
5) Place fabric swatch lying flat into a stainless steel tray that is larger than the swatch.
6) Pour the organo siloxane polymer solution over the entire swatch as evenly as possible.
7) Fold the swatch twice to quarter, then roll it up while gently squeezing to disperse solution to the entire swatch.
8) Unfold and repeat Step 7, folding in the opposite direction
9) To make a control swatch, repeat the procedure described above using 1.3× weight of solvent only (nil active).
10) Lay each swatch on a separate piece of aluminum foil and place in a fume hood to dry overnight.
11) Cure each swatch in an oven with appropriate ventilation at 90° C. for 5 minutes, (a suitable oven is the Mathis Labdryer, with 1500 rpm fan rotation) (Werner Mathis AG, Oberhasli, Switzerland).
12) Condition fabrics in a constant temperature (21° C.+/−2° C.) and humidity (50% RH+/−5% RH) room for at least 6 hours.
13) With scissors, cut the edge of one entire side of each swatch in the warp direction and carefully remove fabric threads one at a time without stressing the fabric until an even edge is achieved.
14) Cut 4 strips of fabric from each swatch (die or rotary cut), parallel to the even edge, that are 2.54 cm wide and at least 10 cm long
15) Evenly clamp the top and bottom (narrower edges) of the fabric strip into the 2.54 cm grips on the tensile tester instrument with a 2.54 cm gap setting, loading a small amount of force (0.1N-0.2N) on the sample.
16) Strain to 10% at 0.83 mm/s and return to 2.54 cm gap at the same rate.
17) Release bottom clamp and re-clamp sample during the hold cycle, loading 0.1N-0.2N of force on the sample.
18) Repeat Steps 15-16 until 4 hysteresis cycles have been completed for the sample.
19) Analyze 4 fabric samples per treatment swatch by the above method and average the tensile strain values recorded at 0.1N unload for Cycle 4. Recovery is calculated as follows:

$$\% \text{ Recovery} = \frac{(10 - \text{Tensile Strain at } 0.1\ N)}{10} \times 100$$

20) Recovery Index $= \dfrac{\% \text{ Recovery of Treatment}}{\% \text{ Recovery of Control}}$

EXAMPLES

The following non-limiting examples are illustrative. Percentages are by weight unless otherwise specified. While particular aspects have been illustrated and described, other changes and modifications can be made without departing from the spirit and scope of the invention. It is therefore intended to cover in the appended claims all such changes and modifications that are within the scope of this invention.

Preparation of Cross-Linkable Organosiloxane Polymers

Example 1

7.090 mmol of bis(4-isocyanatocyclohexyl)methane (HMDI) is dissolved in 1.2 g IPA in the reactor. 1.754 mmol α, ω-diaminopropyl polydimethylsiloxane (MW=11400 g/mol) (aminosilicone) is dissolved in a separate flask in 4.8 g IPA and introduced into the addition funnel. The PDMS oligomer solution is added dropwise onto the HMDI solution under strong agitation at room temperature. Then 5.104 mmol 1,3-diamino-2-hydroxypropane (chain extender) is dissolved in 1.2 g IPA, introduced into the addition funnel and added dropwise into the prepolymer solution in the reactor under strong agitation at room temperature. Then 0.400 mmol of 3-aminopropyldimethylethoxy silane is dissolved in 0.7 g IPA, introduced into the addition funnel and added dropwise into the prepolymer solution in the reactor under strong agitation at room temperature to complete the reaction. Progress and completion of the reactions are followed by FTIR spectroscopy monitoring the disappearance of strong isocyanate absorption peak at 2265 cm$^{-1}$ to produce the target structure.

Example 2

7.964 mmol of bis(4-isocyanatocyclohexyl)methane (HMDI) is dissolved in 1.2 g IPA in the reactor. 2.000 mmol α, ω-diaminopropyl polydimethylsiloxane (MW=5000 g/mol) (aminosilicone) is dissolved in a separate flask in 4.8 g IPA and introduced into the addition funnel. The PDMS oligomer solution is added dropwise onto the HMDI solution under strong agitation at room temperature. Then 5.864 mmol 1,3-diamino-2-hydroxypropane (chain extender) is dissolved in 1.2 g IPA, introduced into the addition funnel and added dropwise into the prepolymer solution in the reactor under strong agitation at room temperature. Then 0.200 mmol of 3-aminopropyldimethylethoxy silane is dissolved in 0.7 g IPA, introduced into the addition funnel and added dropwise into the prepolymer solution in the reactor under strong agitation at room temperature to complete the reaction. Progress and completion of the reactions are followed by FTIR spectroscopy monitoring the disappearance of strong isocyanate absorption peak at 2265 cm$^{-1}$ to produce the target structure.

Example 3

1.792 mmol of bis(4-isocyanatocyclohexyl)methane (HMDI) is dissolved in 1.2 g IPA in the reactor. 0.400 mmol α, ω-diaminopropyl polydimethylsiloxane (MW=50000 g/mol) (aminosilicone) is dissolved in a separate flask in 4.8 g IPA and introduced into the addition funnel. The PDMS oligomer solution is added dropwise onto the HMDI solution under strong agitation at room temperature. Then 1.221 mmol 1,3-diamino-2-hydroxypropane (chain extender) is dissolved in 1.2 g IPA, introduced into the addition funnel and added dropwise into the prepolymer solution in the reactor under strong agitation at room temperature. Then 0.400 mmol of 3-aminopropyldimethylethoxy silane is dissolved in 0.7 g IPA, introduced into the addition funnel and added dropwise into the prepolymer solution in the reactor under strong agitation at room temperature to complete the reaction. Progress and completion of the reactions are followed by FTIR spectroscopy monitoring the disappearance of strong isocyanate absorption peak at 2265 cm$^{-1}$ to produce the target structure.

Example 4

7.090 mmol of bis(4-isocyanatocyclohexyl)methane (HMDI) is dissolved in 1.2 g IPA in the reactor. 1.754 mmol α, ω-diaminopropyl polydimethylsiloxane (MW=11400 g/mol) (aminosilicone) is dissolved in a separate flask in 4.8 g IPA and introduced into the addition funnel. The PDMS oligomer solution is added dropwise onto the HMDI solution under strong agitation at room temperature. Then 5.104 mmol 1,3-diamino-2-hydroxypropane (chain extender) is dissolved in 1.2 g IPA, introduced into the addition funnel and added dropwise into the prepolymer solution in the reactor under strong agitation at room temperature. Then 0.400 mmol of [3-(2-aminoethylamino)propyl]trimethoxy silane is dissolved in 0.7 g IPA, introduced into the addition funnel and added dropwise into the prepolymer solution in the reactor under strong agitation at room temperature to complete the reaction. Progress and completion of the reactions are followed by FTIR spectroscopy monitoring the disappearance of strong isocyanate absorption peak at 2265 cm$^{-1}$ to produce the target structure.

Example 5

7.964 mmol of bis(4-isocyanatocyclohexyl)methane (HMDI) is dissolved in 1.2 g IPA in the reactor. 2.000 mmol α, ω-diaminopropyl polydimethylsiloxane (MW=5000 g/mol) (aminosilicone) is dissolved in a separate flask in 4.8 g IPA and introduced into the addition funnel. The PDMS oligomer solution is added dropwise onto the HMDI solution under strong agitation at room temperature. Then 5.864 mmol 1,3-diamino-2-hydroxypropane (chain extender) is dissolved in 1.2 g IPA, introduced into the addition funnel and added dropwise into the prepolymer solution in the reactor under strong agitation at room temperature. Then 0.200 mmol of [3-(2-aminoethylamino)propyl]trimethoxy silane is dissolved in 0.7 g IPA, introduced into the addition funnel and added dropwise into the prepolymer solution in the reactor under strong agitation at room temperature to complete the reaction. Progress and completion of the reactions are followed by FTIR spectroscopy monitoring the disappearance of strong isocyanate absorption peak at 2265 cm$^{-1}$ to produce the target structure.

Example 6

1.792 mmol of bis(4-isocyanatocyclohexyl)methane (HMDI) is dissolved in 1.2 g IPA in the reactor. 0.400 mmol α, ω-diaminopropyl polydimethylsiloxane (MW=50000 g/mol) (aminosilicone) is dissolved in a separate flask in 4.8 g IPA and introduced into the addition funnel. The PDMS oligomer solution is added dropwise onto the HMDI solution under strong agitation at room temperature. Then 1.221 mmol 1,3-diamino-2-hydroxypropane (chain extender) is dissolved in 1.2 g IPA, introduced into the addition funnel and added dropwise into the prepolymer solution in the reactor under strong agitation at room temperature. Then 0.400 mmol of [3-(2-aminoethylamino)propyl]trimethoxy silane is dissolved in 0.7 g IPA, introduced into the addition funnel and added dropwise into the prepolymer solution in the reactor under strong agitation at room temperature to complete the reaction. Progress and completion of the reactions are followed by FTIR spectroscopy monitoring the disappearance of strong isocyanate absorption peak at 2265 cm$^{-1}$ to produce the target structure.

Example 7

7.090 mmol of bis(4-isocyanatocyclohexyl)methane (HMDI) is dissolved in 1.2 g IPA in the reactor. 1.754 mmol α, ω-diaminopropyl polydimethylsiloxane (MW=11400 g/mol) (aminosilicone) is dissolved in a separate flask in 4.8 g IPA and introduced into the addition funnel. The PDMS oligomer solution is added dropwise onto the HMDI solution under strong agitation at room temperature. Then 5.104 mmol 1,3-diamino-2-hydroxypropane (chain extender) is dissolved in 1.2 g IPA, introduced into the addition funnel and added dropwise into the prepolymer solution in the reactor under strong agitation at room temperature. Then 0.400 mmol of 3-aminopropyldimethylethoxy silane is dissolved in 0.7 g IPA, introduced into the addition funnel and added dropwise into the prepolymer solution in the reactor under strong agitation at room temperature to complete the reaction. Progress and completion of the reactions are followed by FTIR spectroscopy monitoring the disappearance of strong isocyanate absorption peak at 2265 cm$^{-1}$ to produce the target structure. 6.400 mmol of (diethylamino) methyltriethoxysilane is added to complete the preparation.

Example 8

7.090 mmol of bis(4-isocyanatocyclohexyl)methane (HMDI) is dissolved in 1.2 g IPA in the reactor. 1.754 mmol α, ω-diaminopropyl polydimethylsiloxane (MW=11400 g/mol) (aminosilicone) is dissolved in a separate flask in 4.8 g IPA and introduced into the addition funnel. The PDMS oligomer solution is added dropwise onto the HMDI solution under strong agitation at room temperature. Then 5.104 mmol 1,3-diamino-2-hydroxypropane (chain extender) is dissolved in 1.2 g IPA, introduced into the addition funnel and added dropwise into the prepolymer solution in the reactor under strong agitation at room temperature. Then 0.400 mmol of 3-aminopropyldimethylethoxy silane is dissolved in 0.7 g IPA, introduced into the addition funnel and added dropwise into the prepolymer solution in the reactor under strong agitation at room temperature to complete the reaction. Progress and completion of the reactions are followed by FTIR spectroscopy monitoring the disappearance of strong isocyanate absorption peak at 2265 cm$^{-1}$ to produce the target structure. 6.400 mmol of methyltriethoxysilane is added to complete the preparation.

TABLE II

Examples 9-17: Exemplary Rinse-Added Fabric Care Compositions
Nine (9) different rinse-added fabric care compositions are made below by mixing together ingredients shown below:

| Component Material | Examples 9-17 Wt % |
|---|---|
| Di-tallowoylethanolester dimethylammonium chloride[1] | 11.0 |
| Polymer from Examples 1-8 or mixtures of such polymers Citral[2] | 5.0 |
|  | 0.2 |
| Water, perfume, suds suppressor, stabilizers & other optional ingredients | to 100% pH 2.5-3.0 |

As there are eight different polymers, plus mixtures thereof, nine different compositions are made.

TABLE III

Examples 18-26: Exemplary Rinse-Added Fabric Care Compositions
Nine (9) different rinse-added fabric care compositions are made below by mixing together ingredients shown below:

| Component Material | Examples 17-26 Wt % |
|---|---|
| Di-tallowoylethanolester dimethylammonium chloride[1] | 11.0 |

TABLE III-continued

Examples 18-26: Exemplary Rinse-Added Fabric Care Compositions
Nine (9) different rinse-added fabric care compositions are made below by mixing together ingredients shown below:

| Component Material | Examples 17-26 Wt % |
|---|---|
| Polymer from Examples 1-8 | 5.0 |
| Benzaldehyde[2] | 0.3 |
| Water, perfume, suds suppressor, stabilizers & other optional ingredients | to 100% pH 2.5-3.0 |

As there are eight different polymers, plus mixtures thereof, nine different compositions are made.

TABLE IV

Examples 27-36: Exemplary Liquid Detergent Fabric Care Compositions:
Nine (9) different liquid detergent fabric care compositions are prepared by mixing together the ingredients listed in the proportions shown.

| Component Material | Examples 27-36 Wt % |
|---|---|
| C12-15 alkyl polyethoxylate (1.8) sulfate[4] | 20.1 |
| C12 alkyl trimethyl ammonium chloride[5] | 2.0 |
| 1,2 Propane diol | 4.5 |
| Ethanol | 3.4 |
| Neodol 23-9[6] | 0.36 |
| $C_{12-18}$ Fatty Acid[4] | 2.0 |
| Sodium cumene sulfonate | 1.8 |
| Citric acid | 3.4 |
| Protease[7] (32 g/L) | 0.42 |
| Fluorescent Whitening Agent[8] | 0.08 |
| DTPA | 0.5 |
| Ethoxylated polyamine[9] | 0.7 |
| Hydrogenated castor oil | 0.2 |
| Copolymer of acrylamide and methacrylamidopropyl trimethylammonium chloride[3] | 0.3 |
| Polymer of Example 1-8 | 6.0 |
| Perfume Aldehyde - benzaldehyde[2] | 0.2 |
| Water, perfume, enzymes, suds suppressor, brightener, enzyme stabilizers & other optional ingredients | To 100% pH = 8.0 |

As there are eight different polymers, plus mixtures thereof, nine different compositions are made.

TABLE IV

Examples 37-46: Exemplary Liquid Detergent Fabric Care Compositions:
Nine (9) different liquid detergent fabric care compositions are prepared by mixing together the ingredients listed in the proportions shown.

| Ingredient | Examples 37-46 WT % |
|---|---|
| C12-14 alkyl-3-ethoxy sulfate[4] | 10.6 |
| Linear alkyl benzene sulfonate[10] | 0.8 |
| Neodol 45-8[6] | 6.3 |
| Citric Acid | 3.8 |
| $C_{12-18}$ Fatty Acids | 7.0 |
| Protease B[7] | 0.35 |
| Tinopal AMS-X[8] | 0.09 |
| Zwitterionic ethoxylated quaternized sulfated hexamethylene diamine[11] | 1.11 |
| Benzaldehyde[2] | 0.3 |
| Dequest 2010[12] | 0.17 |
| Polymer from Examples 1-8 | 4.0 |
| Terpolymer of acrylamide/acrylic acid and methacrylamidopropyl trimethyl ammonium chloride[3] | 0.2 |
| Hydrogenated castor oil | 0.2 |
| Ethyleneglycol distearate[13] | 0.2 |
| Water, perfumes, dyes, and other optional agents/components | to 100% pH 8.5 |

As there are eight different polymers, plus mixtures thereof, nine different compositions are made.

[1] Available from Degussa Corporation, Hopewell, Va.
[2] Available from Sigma Aldrich, Milwaukee, Wis.
[3] Available from Nalco Chemicals, Naperville, Ill.

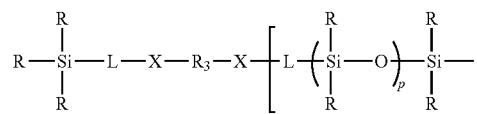

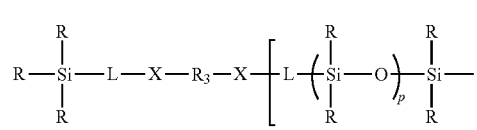

[4] Available from Shell Chemicals, Houston, Tex.
[5] Available from Degussa Corporation, Hopewell, Va.
[6] Available from Shell Chemicals, Houston, Tex.
[7] Available from Genencor International, South San Francisco, Calif.
[8] Available from Ciba Specialty Chemicals, High Point, N.C.
[9] Available from Procter & Gamble.
[10] Available from Huntsman Chemicals, Salt Lake City, Utah
[11] Chelant, sold under the tradename LUTENSIT®, available from BASF (Ludwigshafen, Germany) and described in WO 01/05874.
[12] Available from Dow Chemicals, Edgewater, N.J.
[13] Available from Stepan Chemicals, Northfield, Ill.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fabric care composition comprising
   a) from about 0.01% to about 30% based on total fabric care composition weight, of an organosiloxane polymer having Formula I, and/or Formula II below:

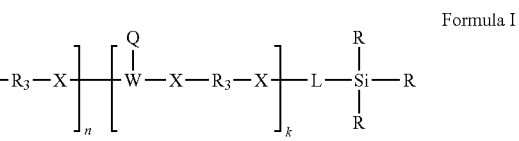

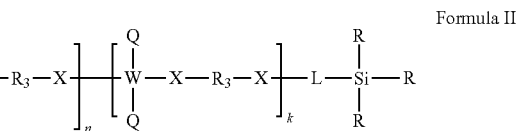

said Formula I comprising a total of from 1 to about 200 Qs and said Formula II comprising from 2 to about 200 Qs, each Q for Formula I and II being independently selected from Formula III, Formula IV and Formula V below:

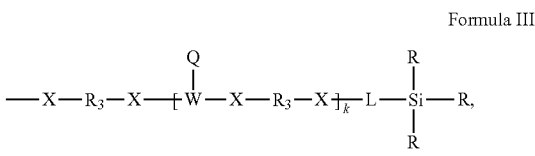

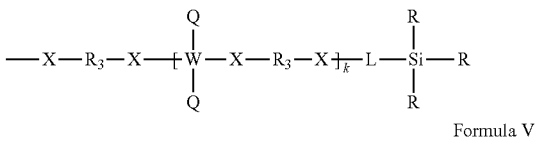

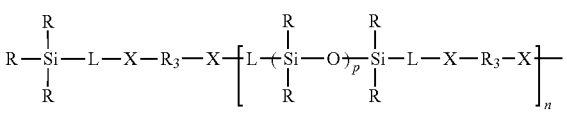

wherein for each Formula I through V;
(i) each X is independently selected from the group consisting of

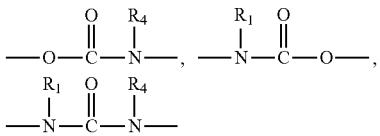

and combinations thereof;
(ii) each L is a linking bivalent alkylene radical,
(iii) at least one, R moiety is —OR$_2$, and all other R moieties are independently selected from the group consisting of H, C$_1$-C$_{20}$ alkyl radical, C$_1$-C$_{20}$ substituted alkyl radical, C$_6$-C$_{20}$ aryl radical, C$_6$-C$_{20}$ substituted aryl radical, C$_7$-C$_{20}$ alkylaryl radical and combinations thereof;

(iv) each $R_1$ is independently selected from the group consisting of, H, a $C_1$-$C_{20}$ alkyl radical, a $C_6$-$C_{10}$ aryl radical, a $C_1$-$C_4$ substituted alkyl radical, and a $C_6$-$C_{10}$ cycloalkyl radical;

(v) each $R_2$ is independently selected from the group consisting of H, a $C_1$-$C_4$ alkyl radical, —C(O)$R_6$ wherein each $R_6$ is independently selected from the group consisting of $C_1$-$C_{20}$ alkyl radical, $C_1$-$C_{20}$ substituted alkyl radical, $C_6$-$C_{20}$ aryl radical, $C_6$-$C_{20}$ substituted aryl radical, and $C_7$-$C_{20}$ alkylaryl radical;

(vi) each $R_3$ is independently selected from the group consisting of an aromatic radical comprising from 6 to 30 carbon atoms, an aliphatic radical comprising from 2 to 30 carbon atoms, and a cycloaliphatic radical comprising from 6 to 30 carbon atoms;

(vii) each $R_4$ is independently selected from the group consisting of H, a $C_1$-$C_{20}$ alkyl radical, a $C_6$-$C_{10}$ aryl radical, a $C_1$-$C_4$ substituted alkyl radical, and a $C_6$-$C_{10}$ cycloalkyl radical;

(viii) each W is independently selected from the group consisting of a $C_1$-$C_{200}$ alkylene radical that optionally comprises at least one hetero atom that interrupts said $C_1$-$C_{200}$ chain, or a substituted $C_1$-$C_{200}$ alkylene radical that optionally comprises at least one hetero atom that interrupts said $C_1$-$C_{200}$ chain and/or optionally at least one hetero atom that interrupts said substituent;

(ix) p is an integer of from about 2 to about 2000;

(x) n is an integer of from about 0 to about 50;

(xi) k is an integer selected from 1 to about 100; and b) optionally, a material having the formula Si($R_7$)$_m$(O$R_8$)$_j$ wherein the index j is 1 to 4 and the index m=4-j and each $R_7$ is independently selected from the group consisting of $C_1$-$C_{20}$ alkyl radical, $C_1$-$C_{20}$ substituted alkyl radical, $C_6$-$C_{20}$ aryl radical, $C_6$-$C_{20}$ substituted aryl radical, and $C_7$-$C_{20}$ alkylaryl radical, and each $R_8$ is independently selected from the group consisting of H, $C_1$-$C_{20}$ alkyl radical, $C_1$-$C_{20}$ substituted alkyl radical, $C_6$-$C_{20}$ aryl radical, $C_6$-$C_{20}$ substituted aryl radical, $C_7$-$C_{20}$ alkylaryl radical, and —C(O)$R_9$, wherein each $R_9$ is independently selected from the group consisting of $C_1$-$C_{20}$ alkyl radical, $C_1$-$C_{20}$ substituted alkyl radical, $C_6$-$C_{20}$ aryl radical, $C_6$-$C_{20}$ substituted aryl radical, and $C_7$-$C_{20}$ alkylaryl radical;

c) optionally a solvent system d) optionally a carrier; and e) optionally, based on total fabric care composition weight, from about 0.1% to about 95%, of a surfactant.

2. A fabric care composition according to claim 1 wherein said organosiloxane polymer comprises, based on total organosiloxane polymer weight, from about 5% to about 100%, of said repeat units having Formula (I).

3. A fabric care composition according to claim 1 wherein 1 to 20 R moieties of Formula I are —O$R_2$.

4. A fabric care composition according to claim 1 wherein the solvent system is selected from the group consisting of a solvent having a C log P from about −0.180 to about 3.764.

5. A fabric care composition according to claim 3 wherein said solvent is selected from the group consisting of ethanol, acetic acid, 1-propanol, 1-butanol, 2-propanol, acetonitrile, t-butyl alcohol, dimethylformamide, acetone, 1,2-dichloroethane, methylene chloride, chloroform, ethylacetate, tetrahydrofuran, dioxane, methyl t-butyl ether, diethyl ether, benzene, toluene, butyl cellosolve, butyl carbitol, hexylene glycol, water, glycerine, polyglycerine, ethylene glycol, diethylene glycol, polyethylene glycol, propylene glycol, dipropylene glycol, polypropylene glycol, butylene glycol, mono, di and triethanolamine, methyldiethanolamine, diethylene glycol monomethyl ether, mono and diacetin, methanol and mixtures thereof.

6. A fabric care composition according to claim 1 wherein said carrier is selected from the group consisting of polymers, waxes, salts and mixtures thereof, and said salt is selected from a detergent builder.

7. A fabric care composition according to claim 1 wherein surfactant is selected from:
 a) an anionic surfactant;
 b) a cationic surfactant;
 c) an amphoteric surfactant;
 d) a nonionic surfactant; and
 e) mixtures thereof.

8. A fabric care composition according to claim 1 wherein said material having the formula Si($R_7$)$_m$O($R_8$)$_j$ is selected from a monoalkoxysilane, a monoacetoxysilane, a dialkoxysilane, a diacetoxysilane, a trialkoxysilane, a triacetoxysilane, a tetraalkoxysilane, a tetraacetoxysilane and mixtures thereof.

9. A fabric care composition according to claim 8 wherein:
 a) said monoalkoxysilane is selected from the group consisting of Methoxytrimethylsilane, Ethoxytrimethylsilane, (3-Aminopropyl) ethoxydimethylsilane, (3-Aminopropyl)methoxydimethylsilane, 2-(Trimethylsiloxy)-1-aminoethane, and mixtures thereof;
 b) said monoacetoxysilane is acetoxytrimethylsilane;
 c) said dialkoxysilane is selected from the group consisting of Dimethoxydimethylsilane, 2-Aminoethyl-3-aminopropylmethyldimethoxysilane, Dimethyldiethoxysilane, (3-Aminopropyl)methyldiethoxysilane, 3-Aminopropylmethyldimethoxysilane and mixtures thereof;
 d) said diacetoxysilane is Diacetoxydimethylsilane;
 e) said trialkoxysilane is selected from the group consisting of (3-Aminopropyl)triethoxylsilane, (3-Aminopropyl)trimethoxysilane, 3-(N-Aminoethyl)aminopropyltrimethoxysilane, Methyltrimethoxysilane, Methyltriethoxysilane, (Aminomethyl)trimethoxysilane and (Diethylamino)methyltriethoxysilane, and mixtures thereof;
 f) said triacetoxysilane is selected from the group consisting of Triacetoxymethylsilane, Triacetoxyethylsilane and mixtures thereof; and
 g) said tetraalkoxysilane is selected from the group consisting of tetramethoxysilane, tetraethoxysilane, and mixtures thereof.

10. A fabric care composition according to claim 1, said fabric care composition, based on total fabric care composition weight, comprising less than 2% of a material that comprises an aldehyde and/or ketone group.

11. A fabric care composition according to claim 1 wherein the surfactant is selected from linear or branched alkyl benzene sulfonate, alkyl sulfate, alkyl ethoxy sulfate, alkyl ethoxylate, alkyl glyceryl sulfonate, quaternary ammonium surfactant, ester quaternary ammonium compound and mixtures thereof.

12. A fabric care composition according to claim 1 wherein the composition comprises an adjunct selected from the group consisting of delivery enhancing agents, fluorescent whitening agents, enzymes, rheology modifiers, builders, and mixtures thereof.

13. A fabric care composition according to claim 11 wherein the composition comprises a delivery enhancing agent.

14. A fabric care composition according to claim 12 wherein the delivery enhancing agent comprises a cationic polymer with a net cationic charge density of from about 0.05 meq/g to about 23 meq/g.

15. The fabric care composition according to claim 1 wherein the composition comprises 0.01% to about 0.3% by weight of a stabilizer.

16. The fabric care composition according to claim 15 wherein the stabilizer comprises a crystalline, hydroxyl-containing stabilizer.

17. A fabric care composition according to claim 1 wherein the composition is in the form of a rinse-added composition.

18. A fabric care composition according to claim 1 wherein the composition is a laundry detergent.

19. A fabric care composition having a recovery Index ($I_R$) of at least 1.1.

20. A method of providing a benefit to a fabric comprising contacting the fabric with a fabric care composition selected from the group consisting of the fabric care compositions of claims 1-19 and mixtures thereof.

21. The method of claim 19 wherein said fabric is in the form of a finished garment and said garment is contacted with said fabric care composition after said garment is transferred or sold to a consumer.

22. A situs, comprising a condensation product of an organosiloxane polymer comprising at least one repeat unit having Formula (I) of claim 1.

23. The composition of claim 1, further comprising from 1% to 49% by weight of the composition of a quaternary ammonium compound suitable for softening fabric, and from 0.1% to 3% perfume.

* * * * *